(12) United States Patent
Shibayama et al.

(10) Patent No.: US 6,349,002 B1
(45) Date of Patent: Feb. 19, 2002

(54) VARIABLE FOCAL LENGTH LENS SYSTEM AND IMAGING APPARATUS EQUIPPED WITH THEREOF

(75) Inventors: Atsushi Shibayama; Kouichi Oshita, both of Tokyo; Keiko Mizuguchi, Kawasaki, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/556,327

(22) Filed: Apr. 24, 2000

(30) Foreign Application Priority Data

Apr. 27, 1999 (JP) .......................................... 11-120047
Feb. 29, 2000 (JP) .......................................... 12-053980

(51) Int. Cl.$^7$ .............................................. G02B 15/14
(52) U.S. Cl. ...................................... 359/689; 359/682
(58) Field of Search ........................ 359/689, 680–682, 359/686–687, 683, 676

(56) References Cited

U.S. PATENT DOCUMENTS

| | | | | |
|---|---|---|---|---|
| 3,771,853 A | * | 11/1973 | Nakamura | 359/682 |
| 3,994,571 A | * | 11/1976 | Hirose | 359/687 |
| 4,647,160 A | | 3/1987 | Ikemori | 359/680 |
| 4,730,907 A | | 3/1988 | Kikuchi et al. | 359/681 |
| 4,810,072 A | | 3/1989 | Takahashi | 359/689 |
| 4,824,223 A | | 4/1989 | Doctor et al. | 359/689 |
| 4,838,666 A | | 6/1989 | Shiraishi | 359/689 |
| 4,999,007 A | | 3/1991 | Aoki et al. | 359/676 |
| 5,009,491 A | | 4/1991 | Hata | 359/689 |
| 5,262,897 A | | 11/1993 | Kawamura | 359/689 |
| 6,124,984 A | | 9/2000 | Shibayama et al. | 359/689 |

FOREIGN PATENT DOCUMENTS

| | | |
|---|---|---|
| JP | 64-40913 | 2/1989 |
| JP | 6-94996 | 4/1994 |
| JP | 10-170826 | 6/1998 |
| JP | 1-23967 | 1/1999 |
| JP | 1-52246 | 2/1999 |

OTHER PUBLICATIONS

Cover page and English abstract of JP 58–14331, Aug. 25, 1983.
Cover page and English abstract of JP 59–18917, Jan. 31, 1984.
Cover page and English abstract of JP 60–181717, Sep. 17, 1985.
Cover page and English abstract of JP 61–200523, Sep. 5, 1987.
Cover page and English abstract of JP 61–286812, Dec. 17, 1986.

(List continued on next page.)

Primary Examiner—Jordan M. Schwartz
(74) Attorney, Agent, or Firm—Miles & Stockbridge P.C.

(57) ABSTRACT

A variable focal length lens system with low cost, suitable for use with a video camera or a digital still camera employing a solid-state imaging device, capable of assembling and adjusting with ease, and to provide an imaging apparatus equipped with the lens system is provided. According to an aspect, it is a variable focal length lens system comprising, in order from an object side, a first lens group having a negative refractive power, a second lens group having a positive refractive power, and a third lens group having a positive refractive power, wherein the first lens group consists of only one cemented negative lens element, the second lens group comprising at least two positive lens element and at least one negative lens element, and the third lens group consists of a single lens element, and wherein a space between the first and second lens group is decreased and a space between the second and third lens group is increased when a state of the lens group positions is changed from the wide-angle end state to the telephoto end state.

14 Claims, 28 Drawing Sheets

OTHER PUBLICATIONS

Cover page and English abstract of JP 62–200316, Sep. 4, 1987.
Cover page and English abstract of JP 63–17423, Jan. 25, 1988.
Cover page and English abstract of JP 63–281113, Nov. 17, 1988.
Cover page and English abstract of JP 1–189622, Jul. 28, 1989.
Cover page and English abstract of JP 4–114116, Apr. 15, 1992.
Cover page and English abstract of JP 6–94996, Apr. 8, 1994.
Cover page and English abstract of JP 6–300968, Oct. 28, 1994.
Cover page and English abstract of JP 7–13077, Jan. 17, 1995.
Cover page and English abstract of JP 7–261083, Oct. 13, 1995.

* cited by examiner

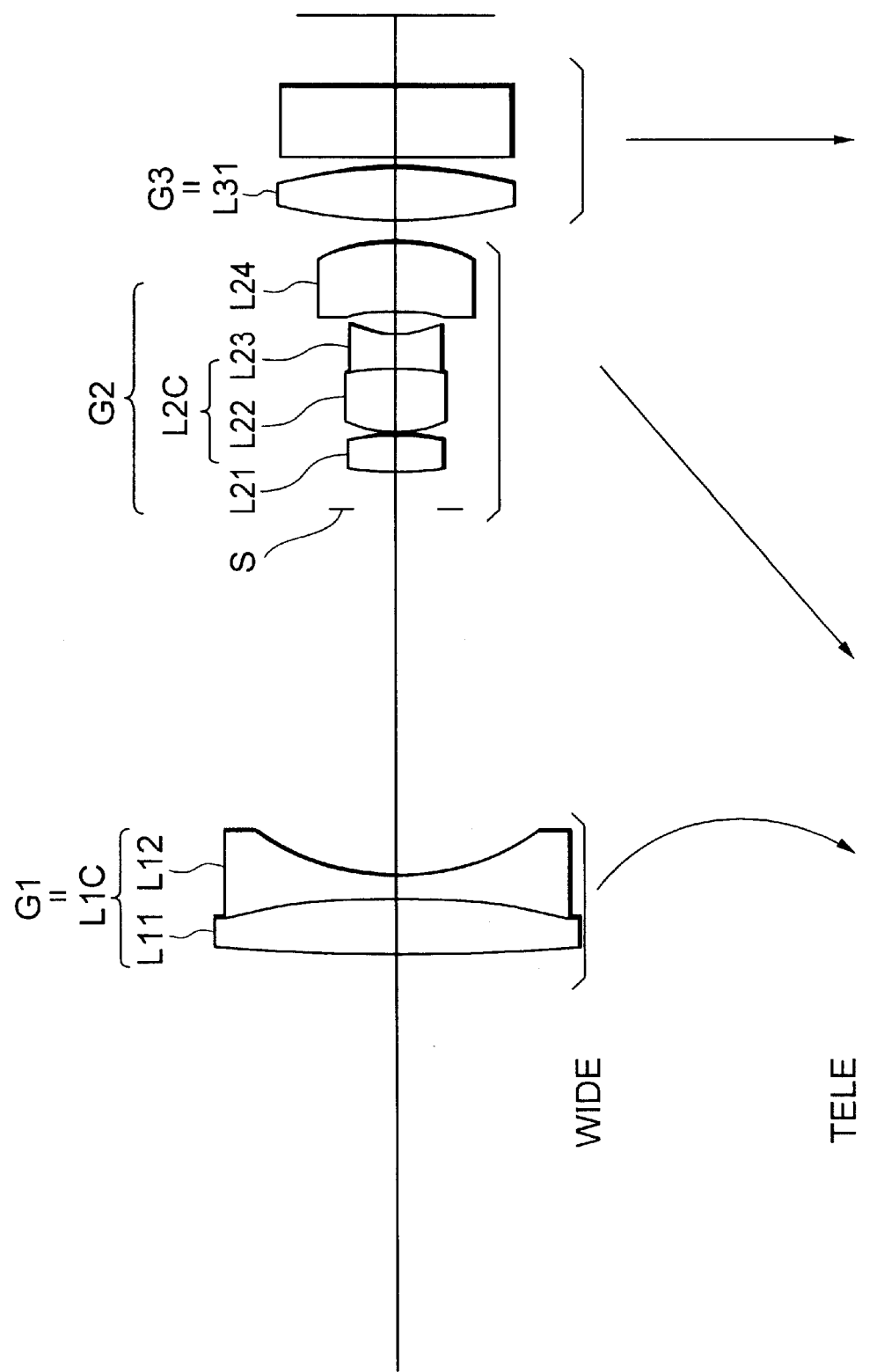

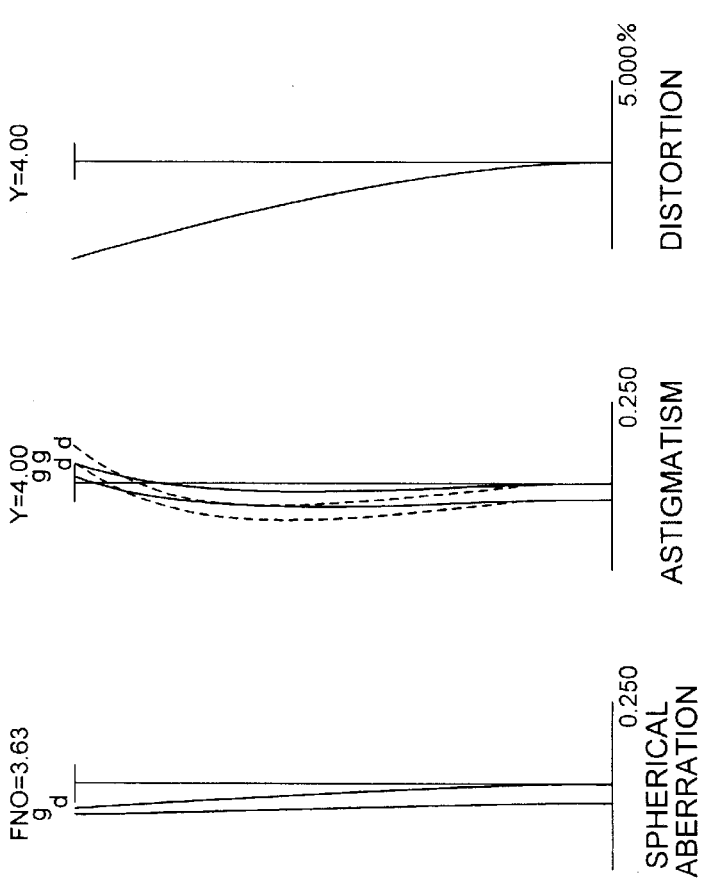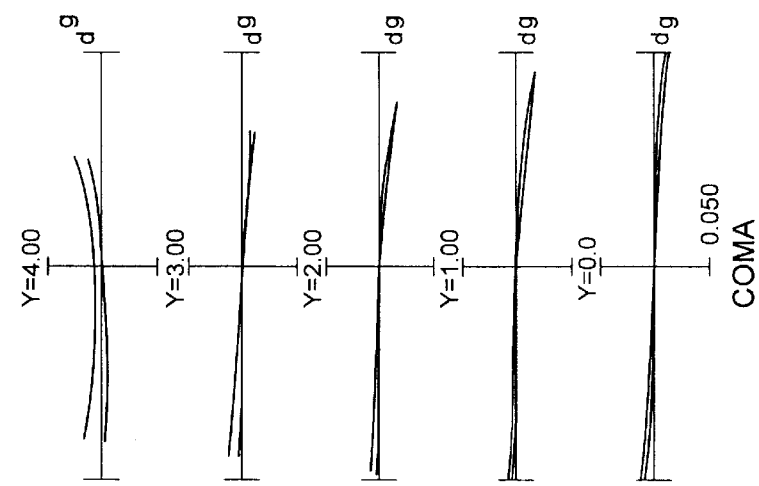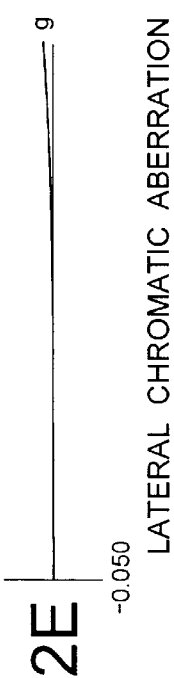

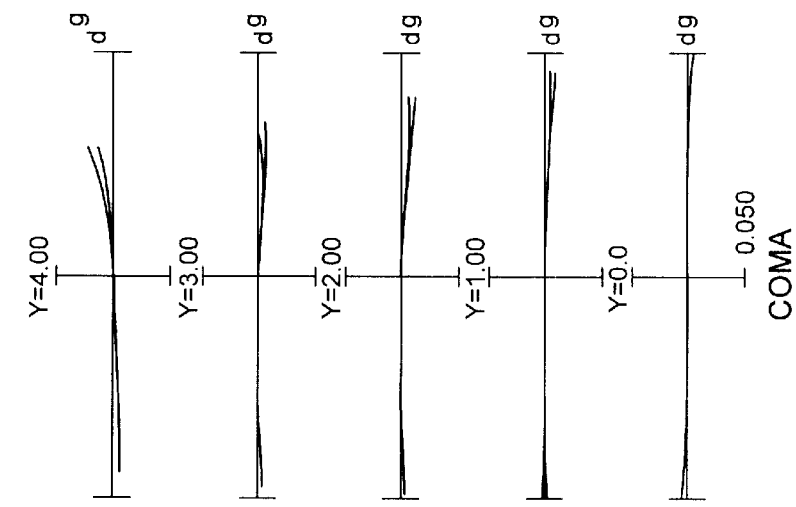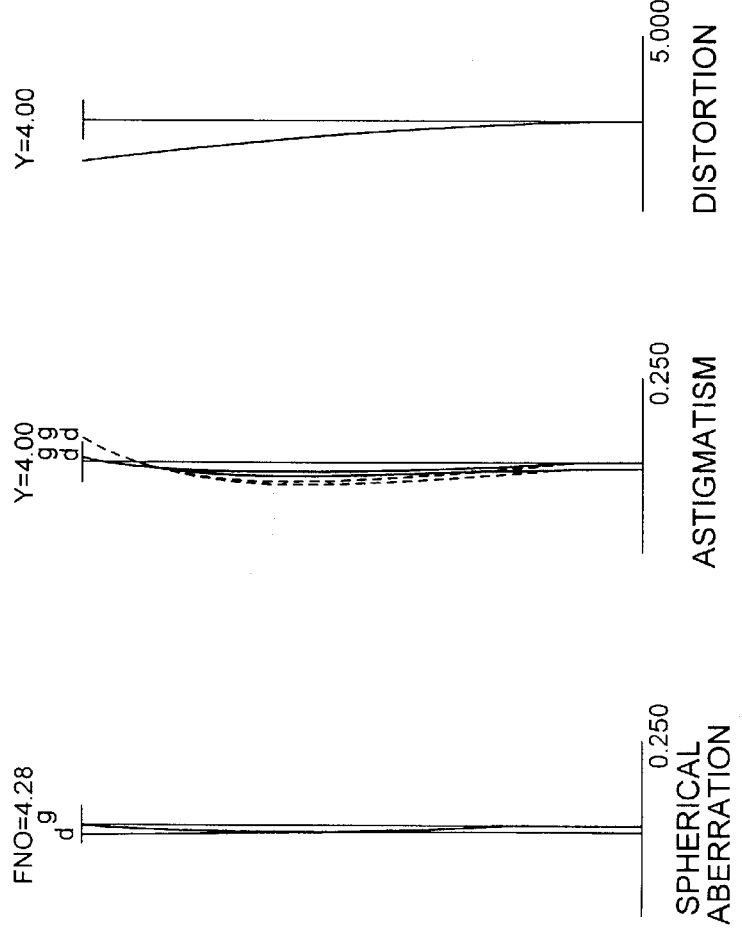

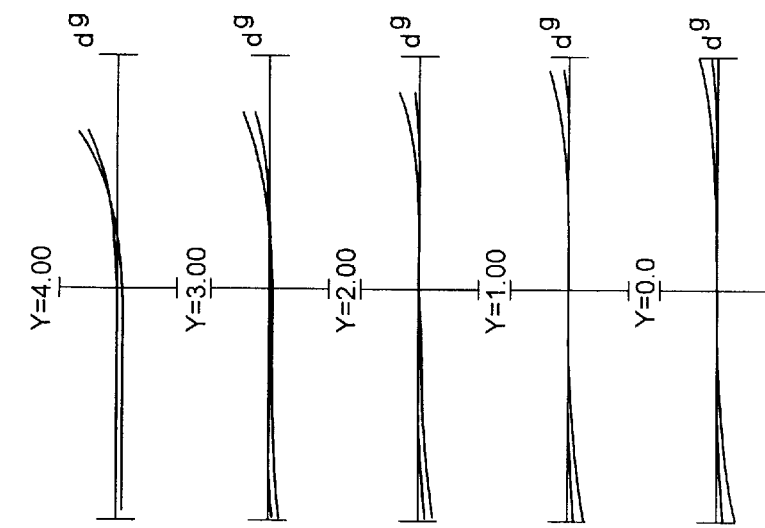
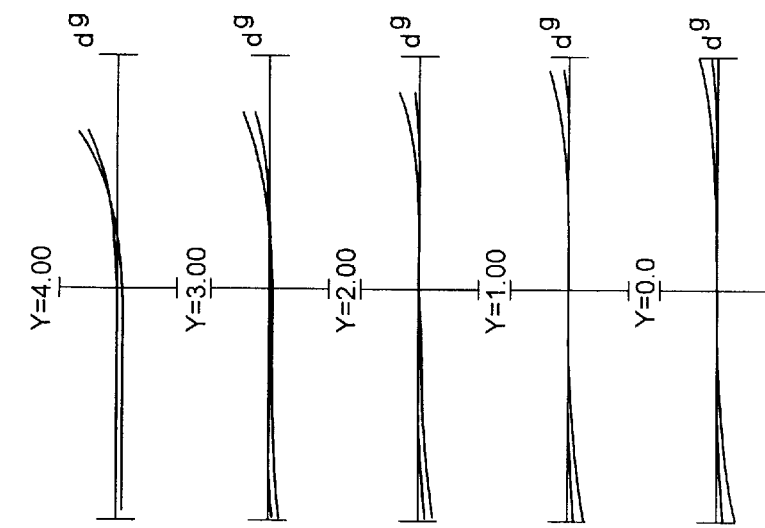
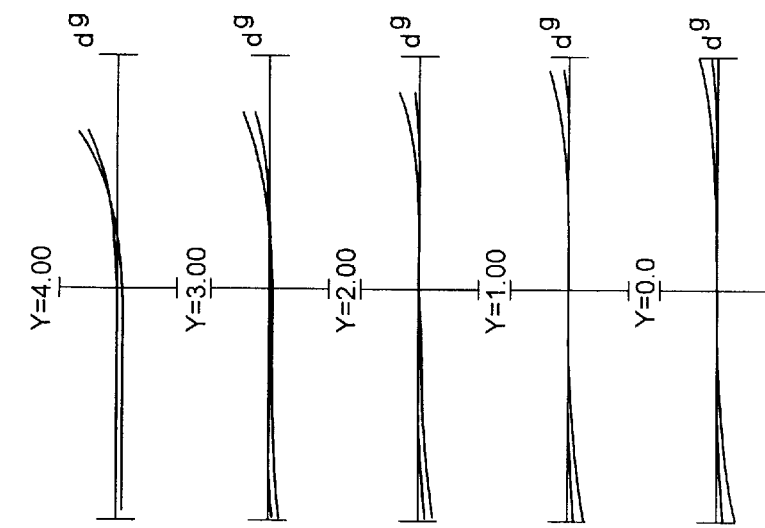
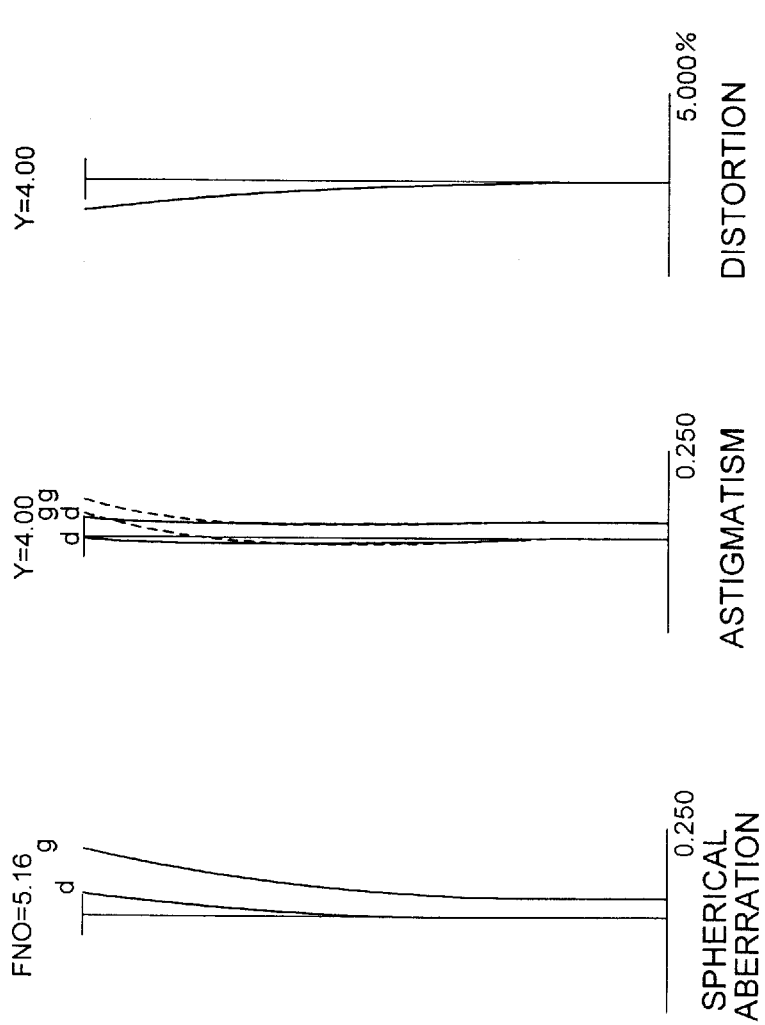

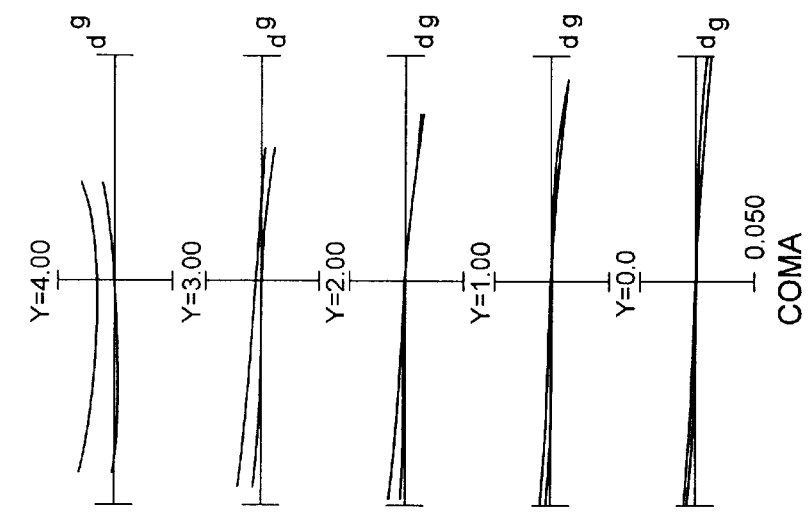
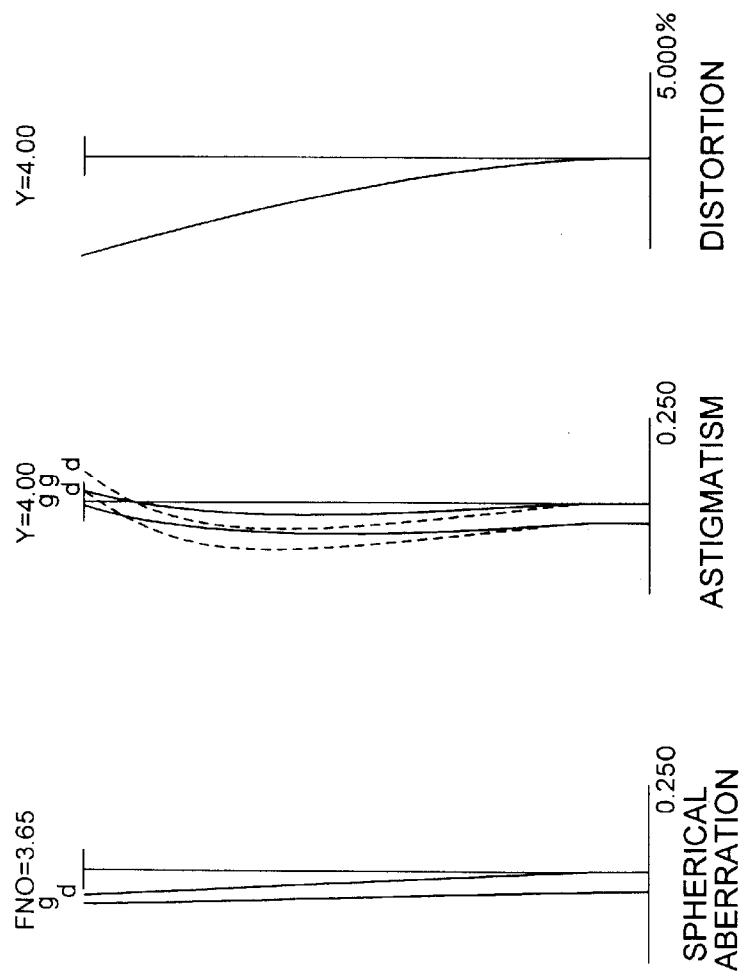
FIG. 6A  FIG. 6B  FIG. 6C  FIG. 6D  FIG. 6E

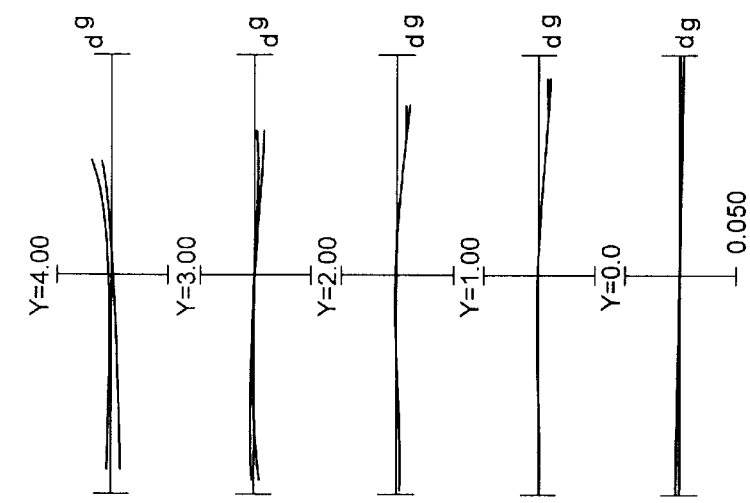
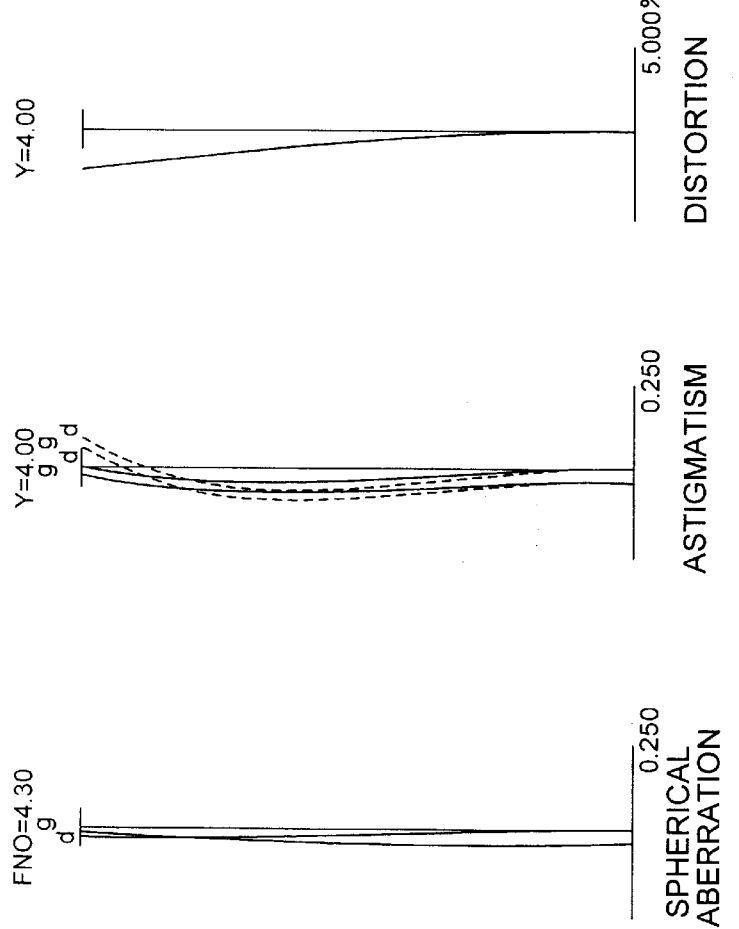

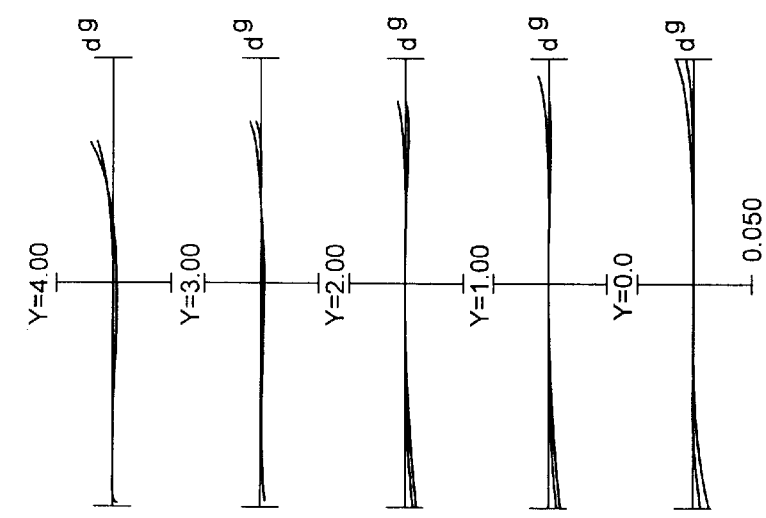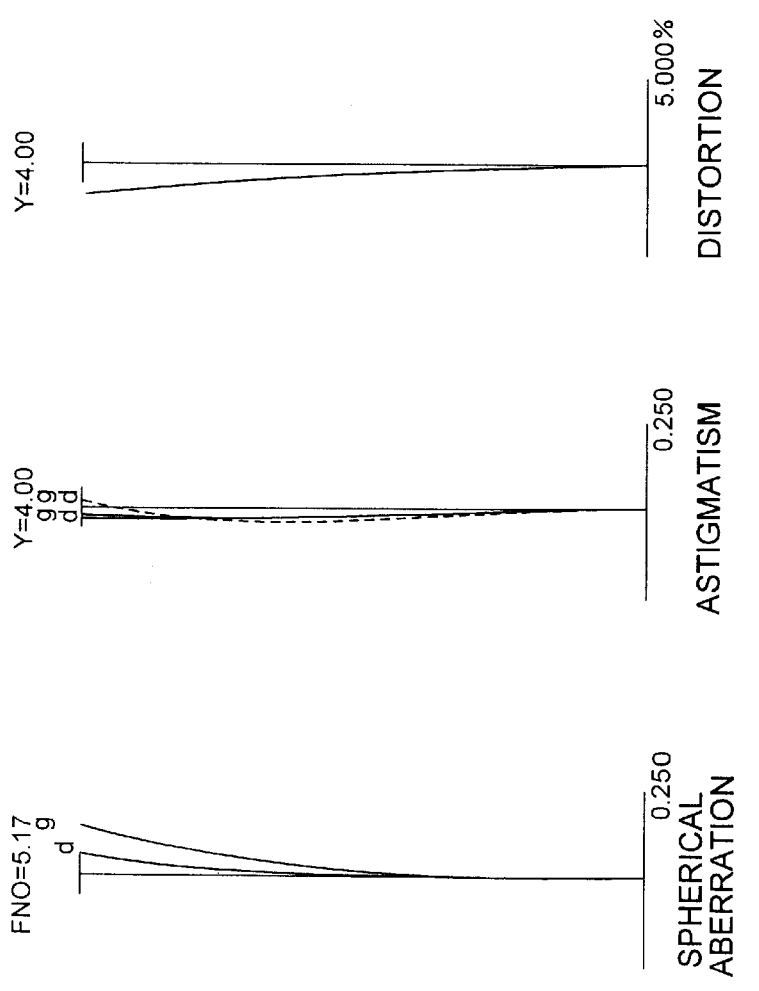

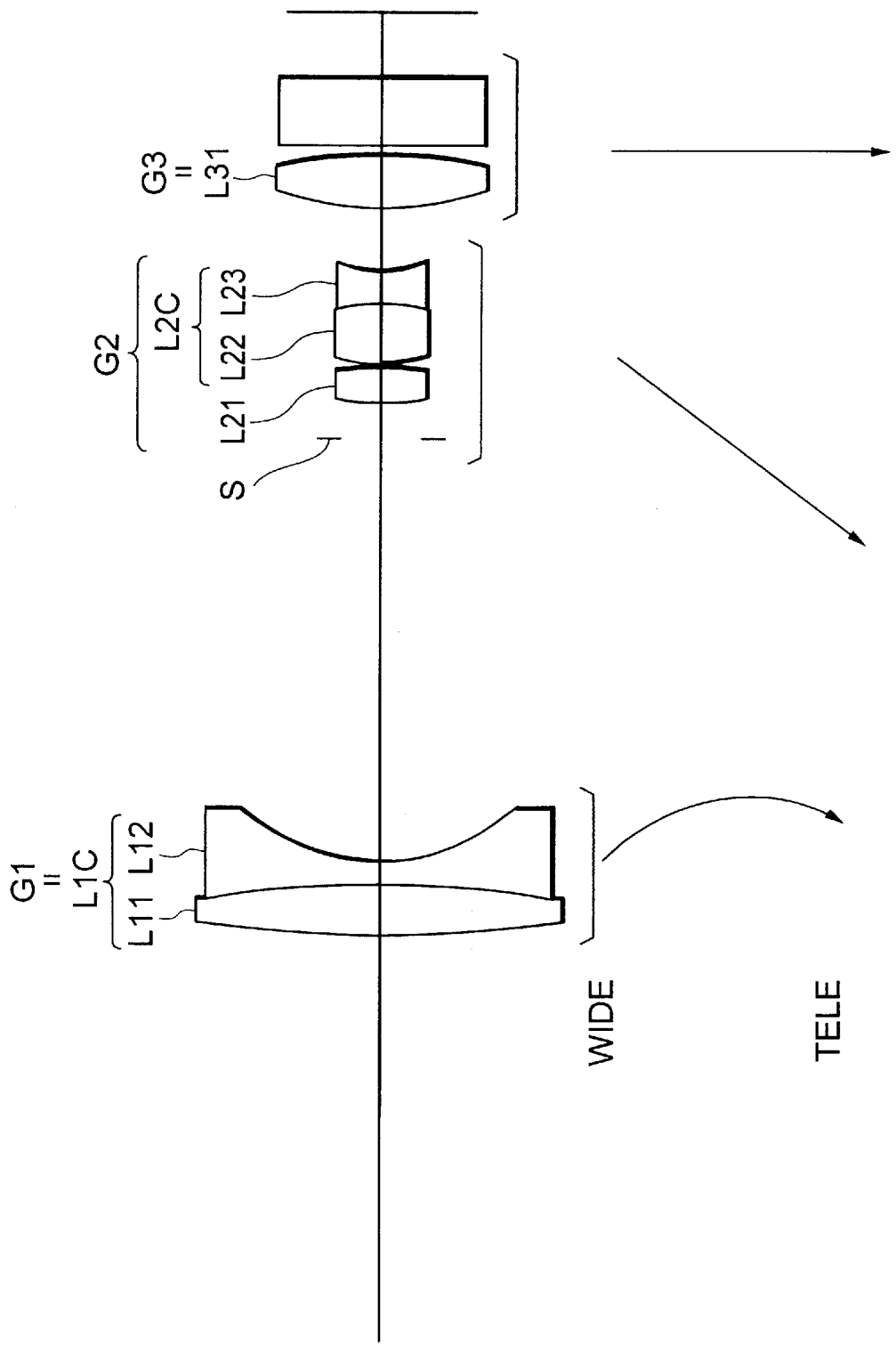

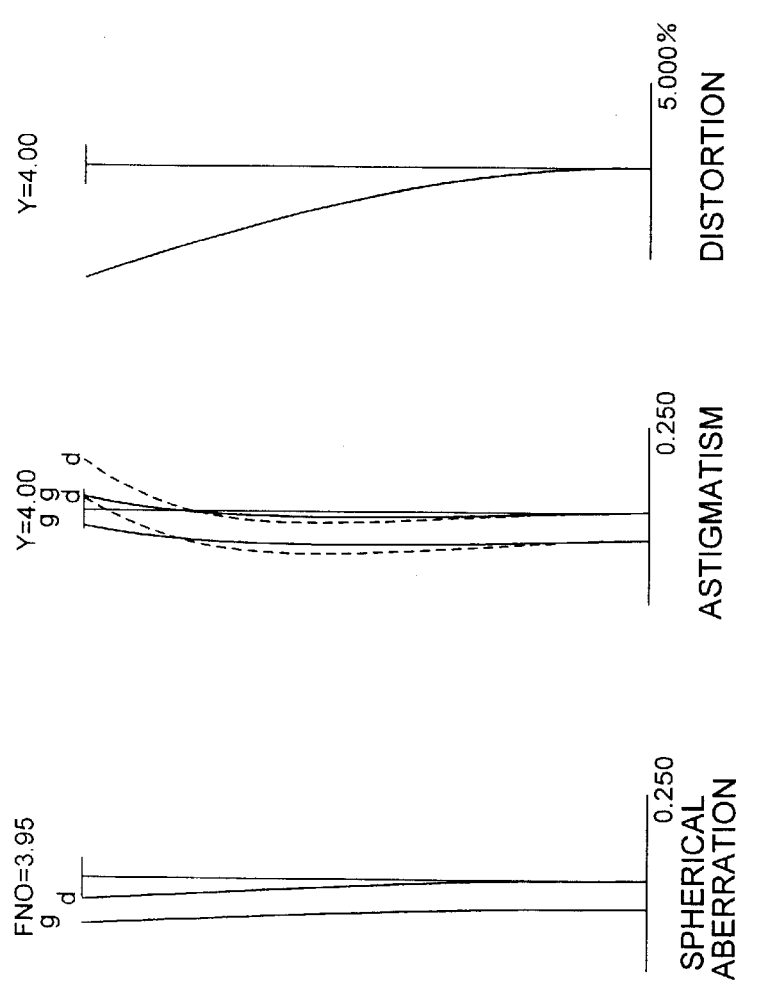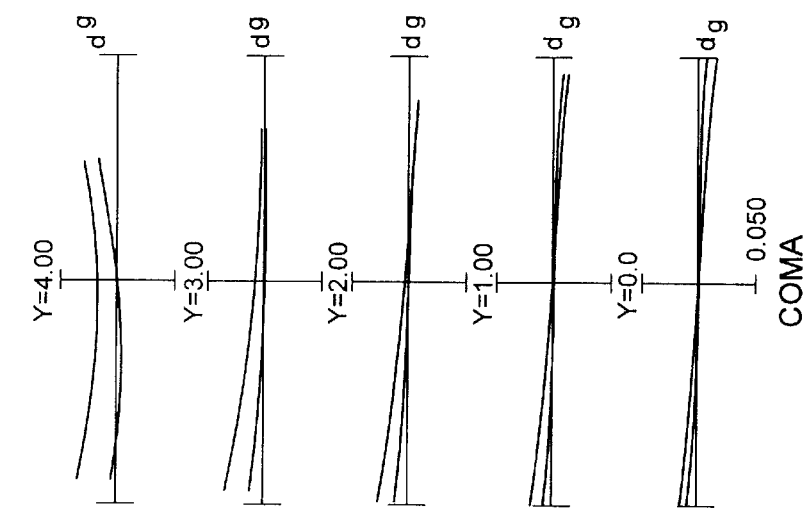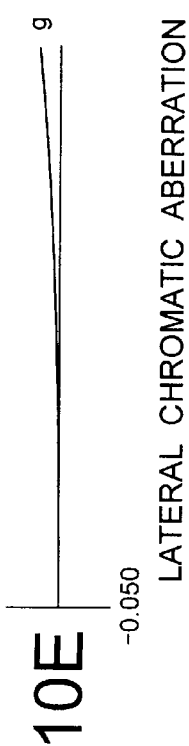

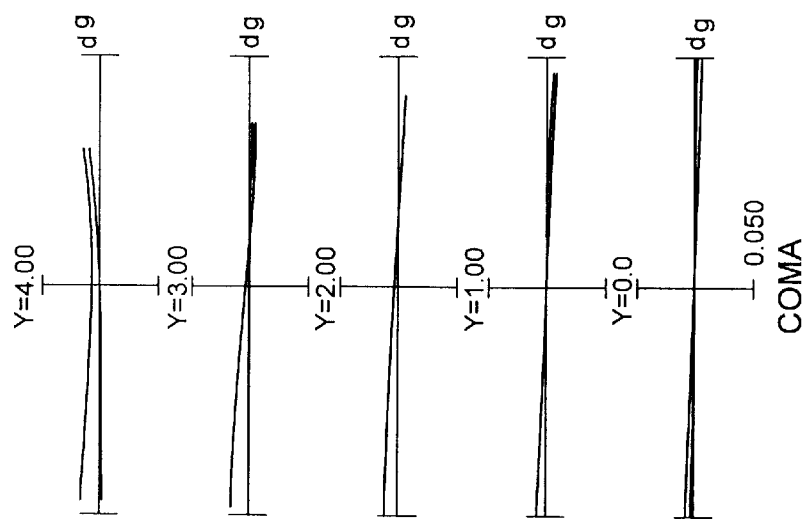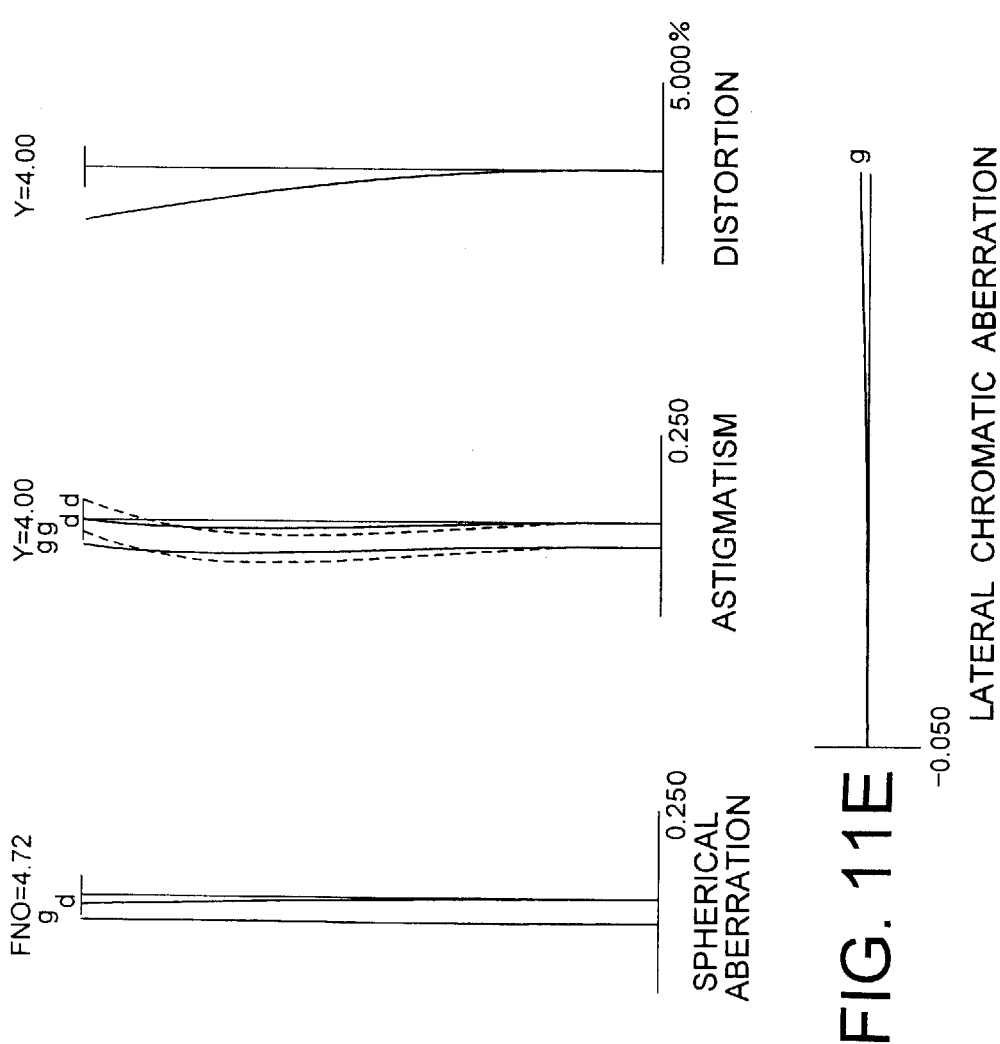

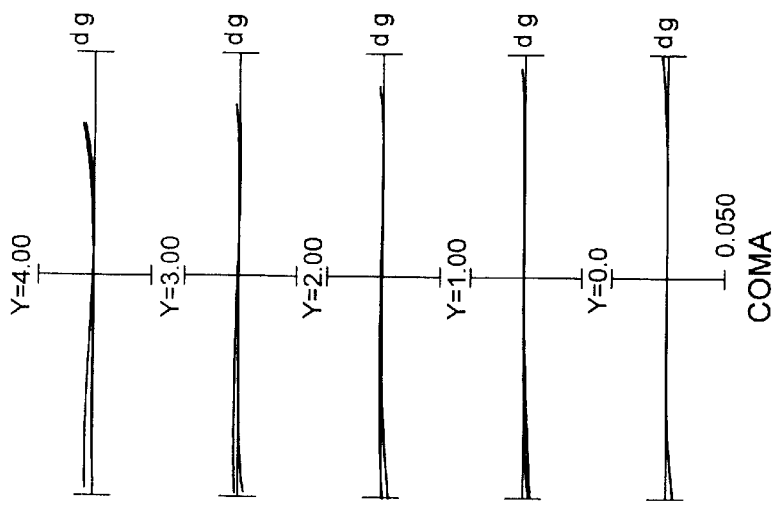
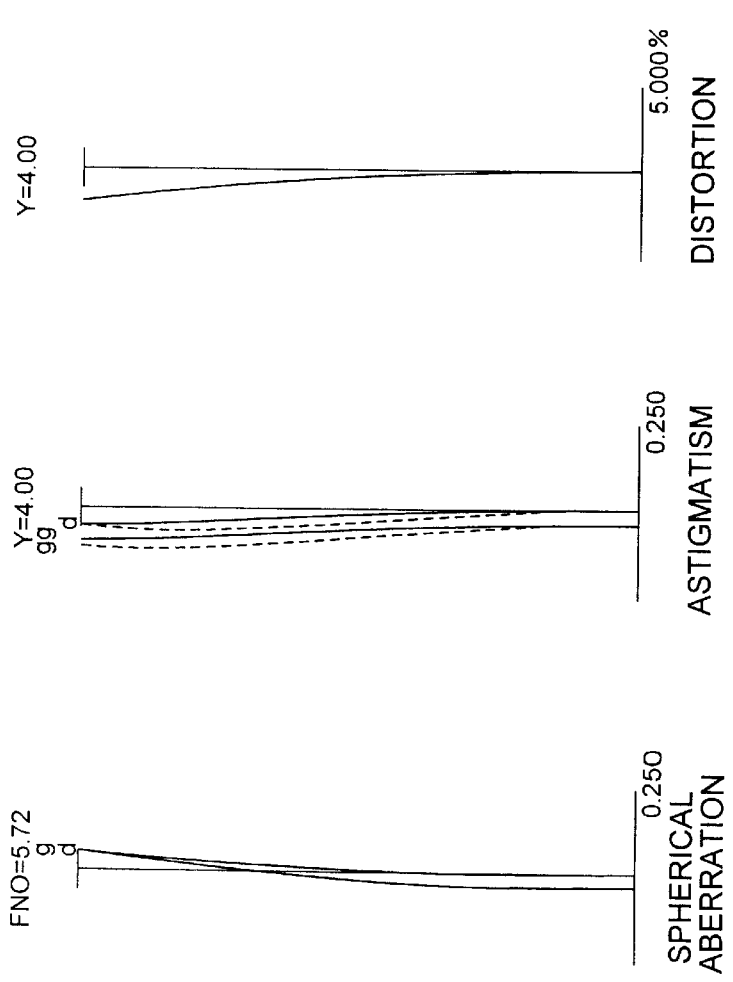
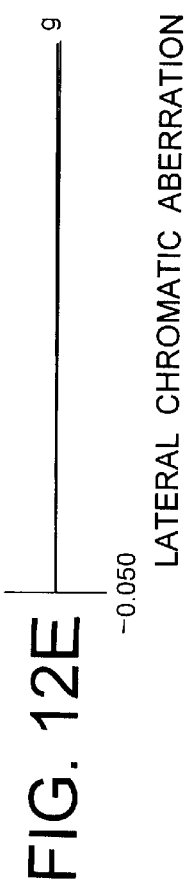

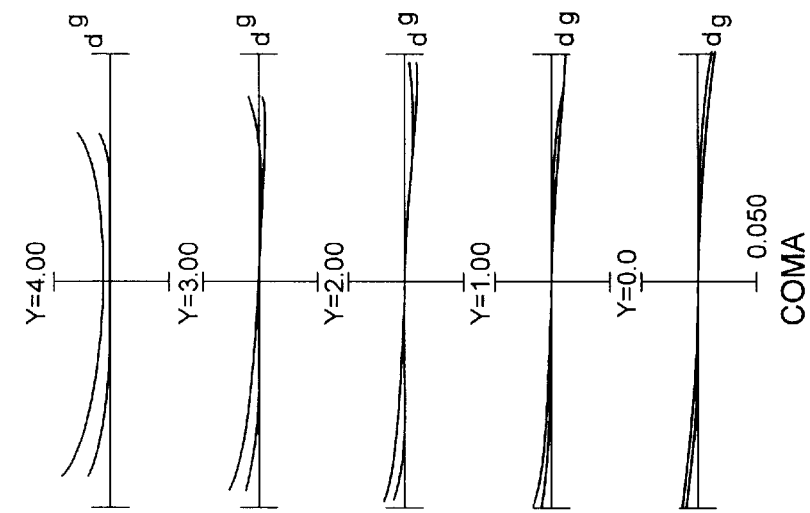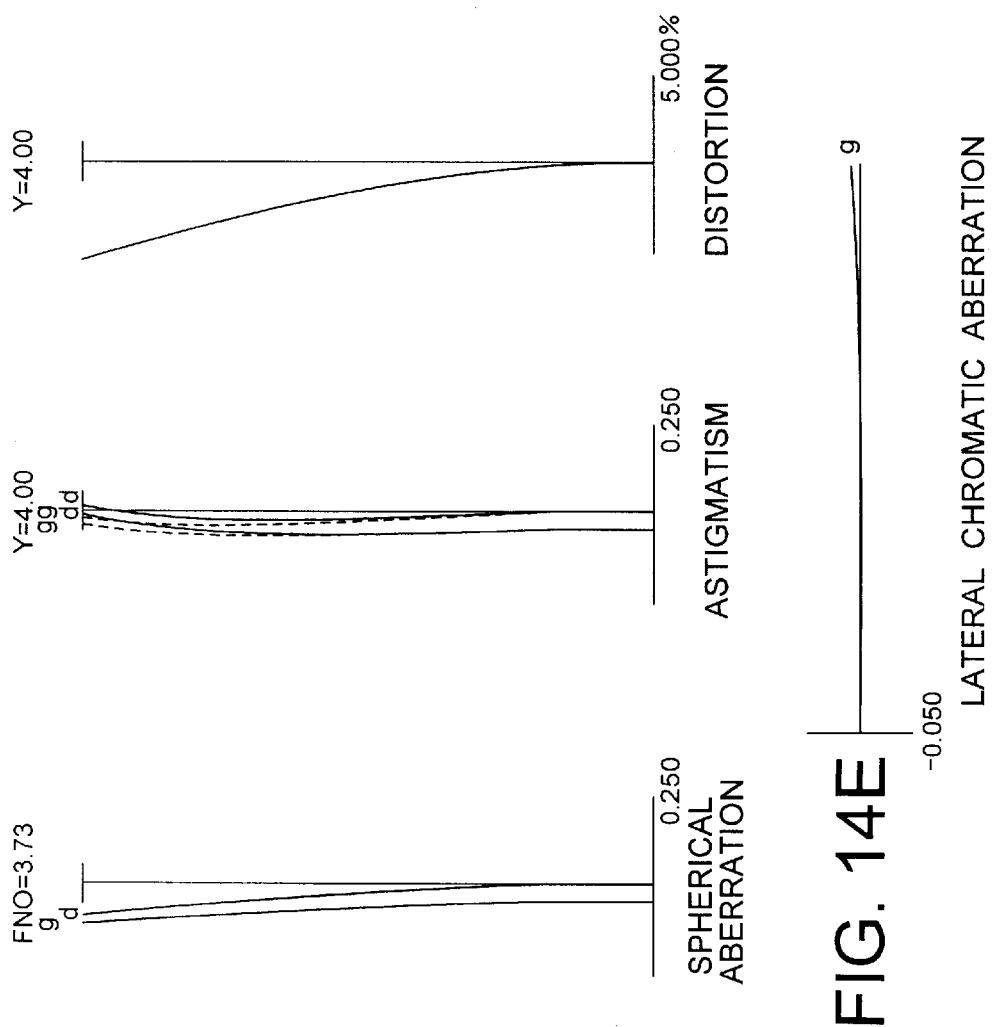

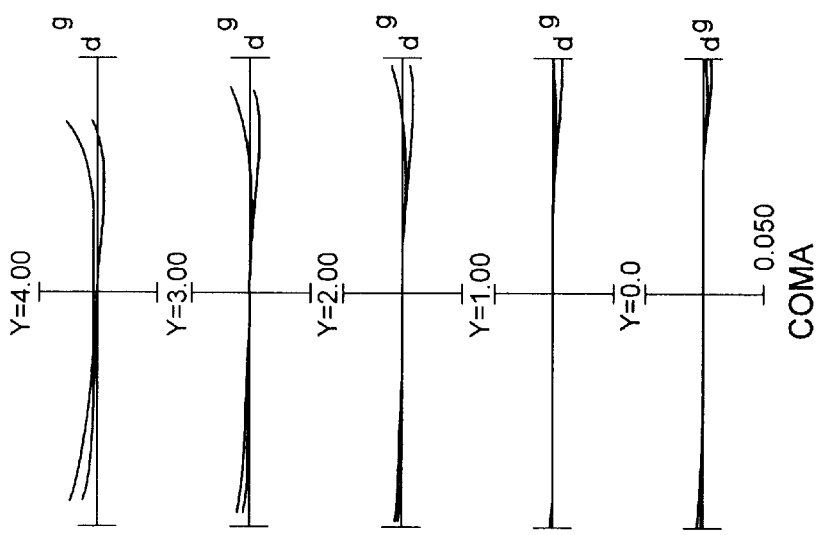
FIG. 15A  FIG. 15B  FIG. 15C  FIG. 15D
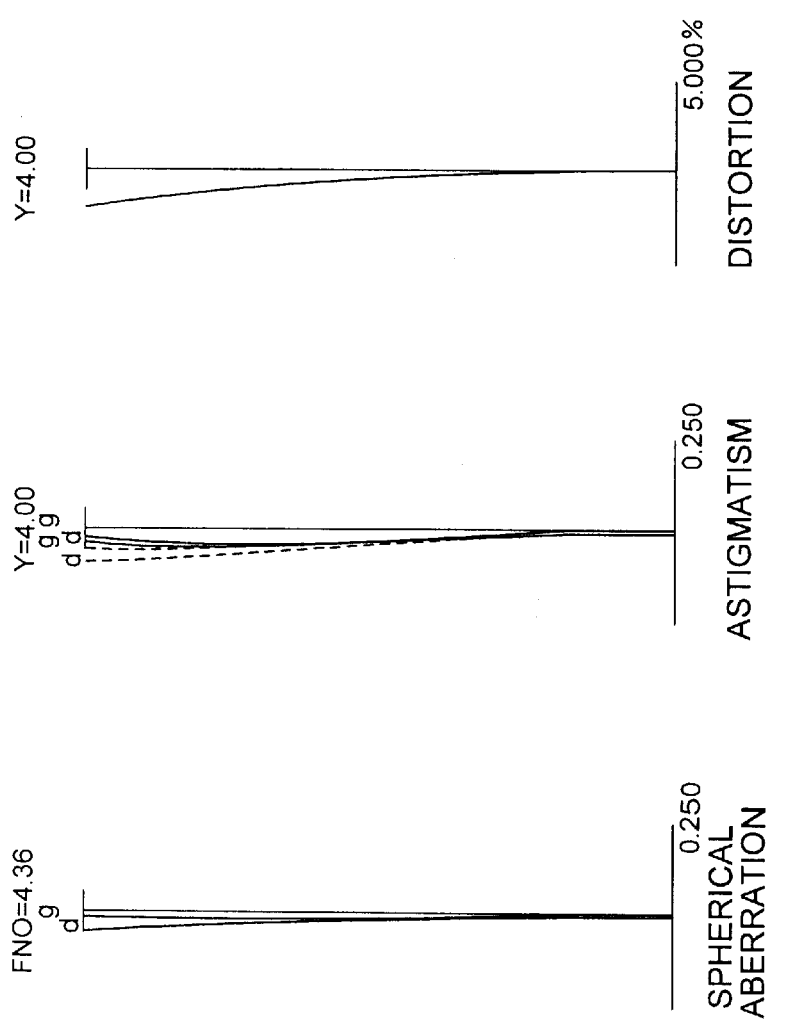
FIG. 15E

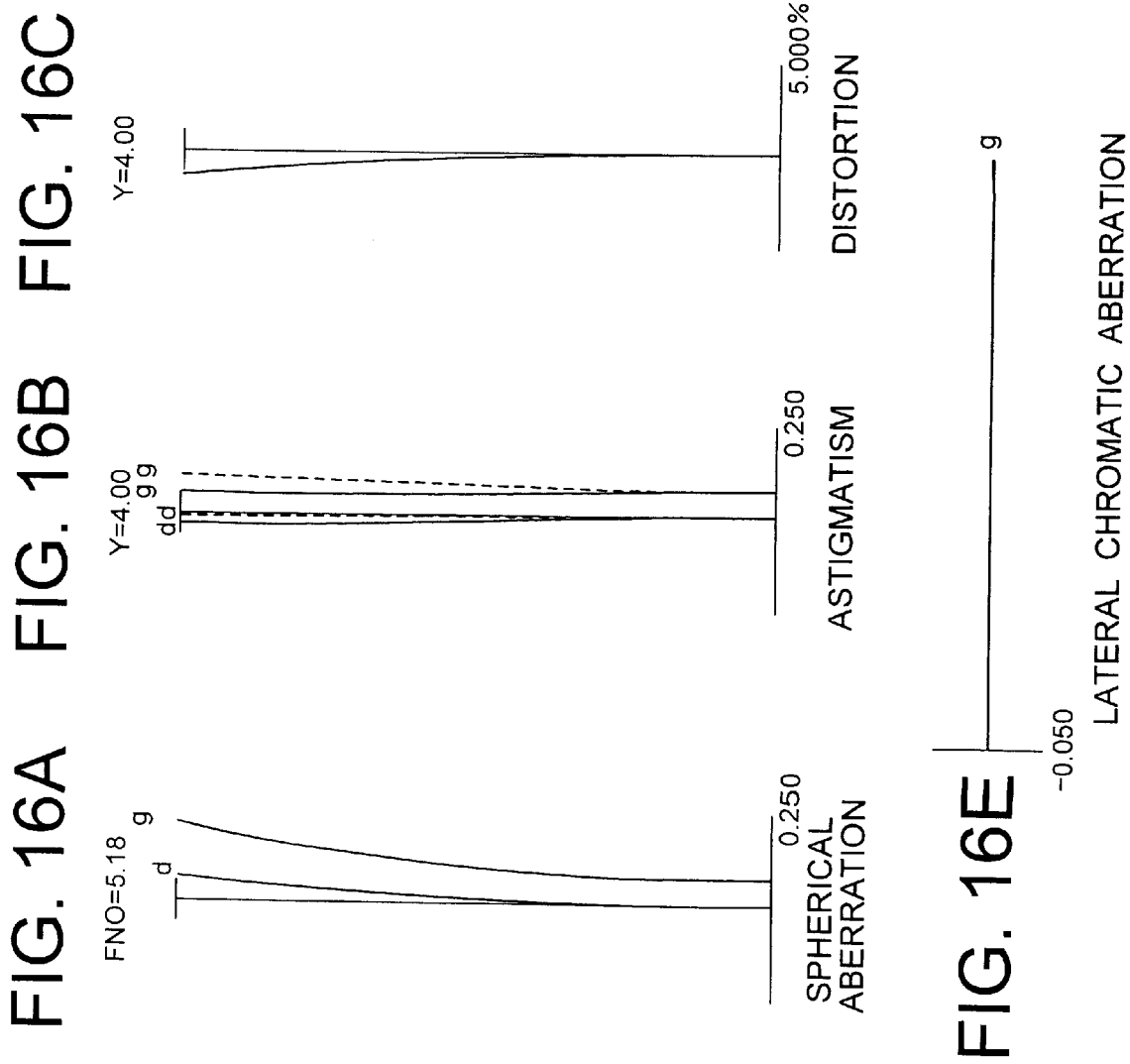

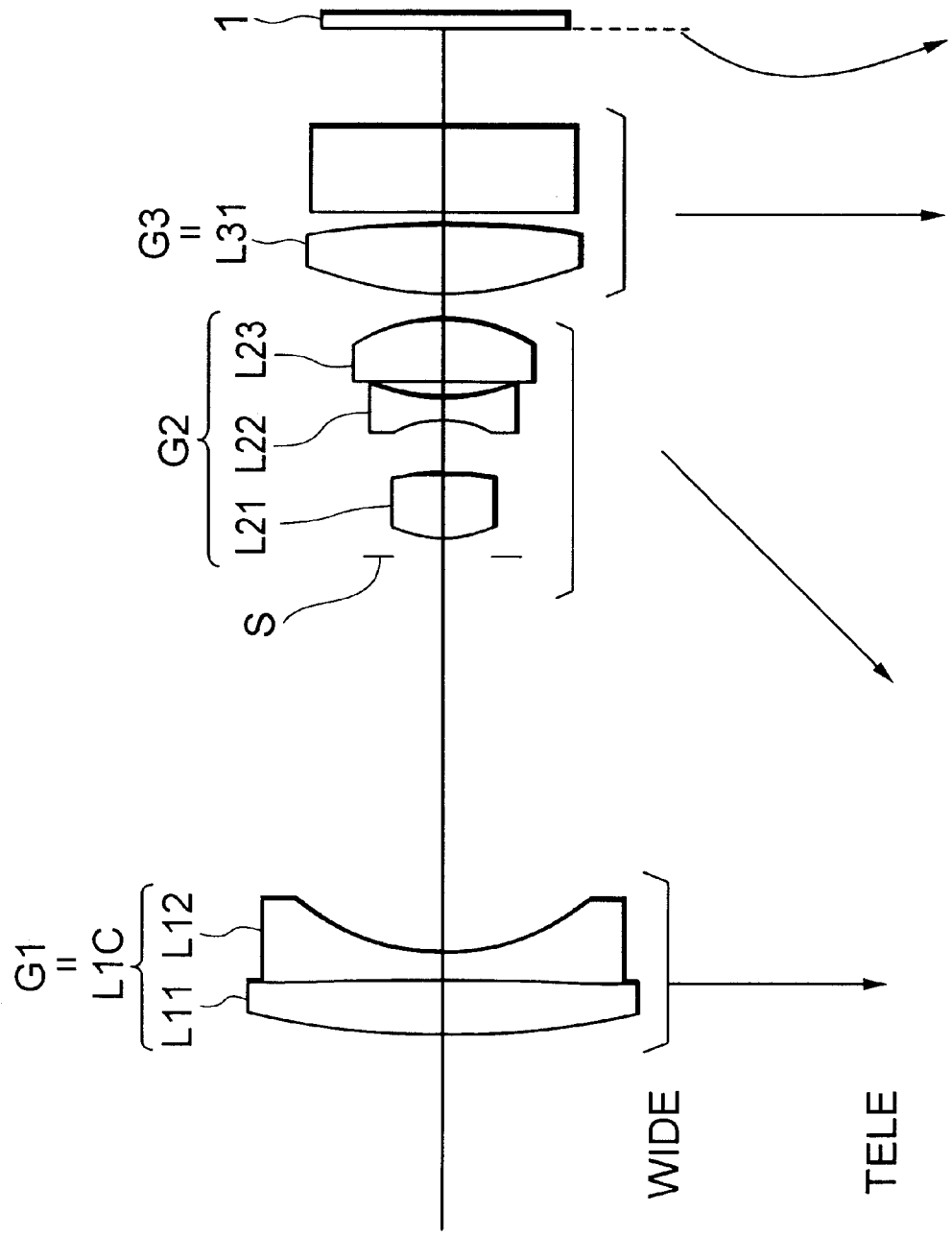

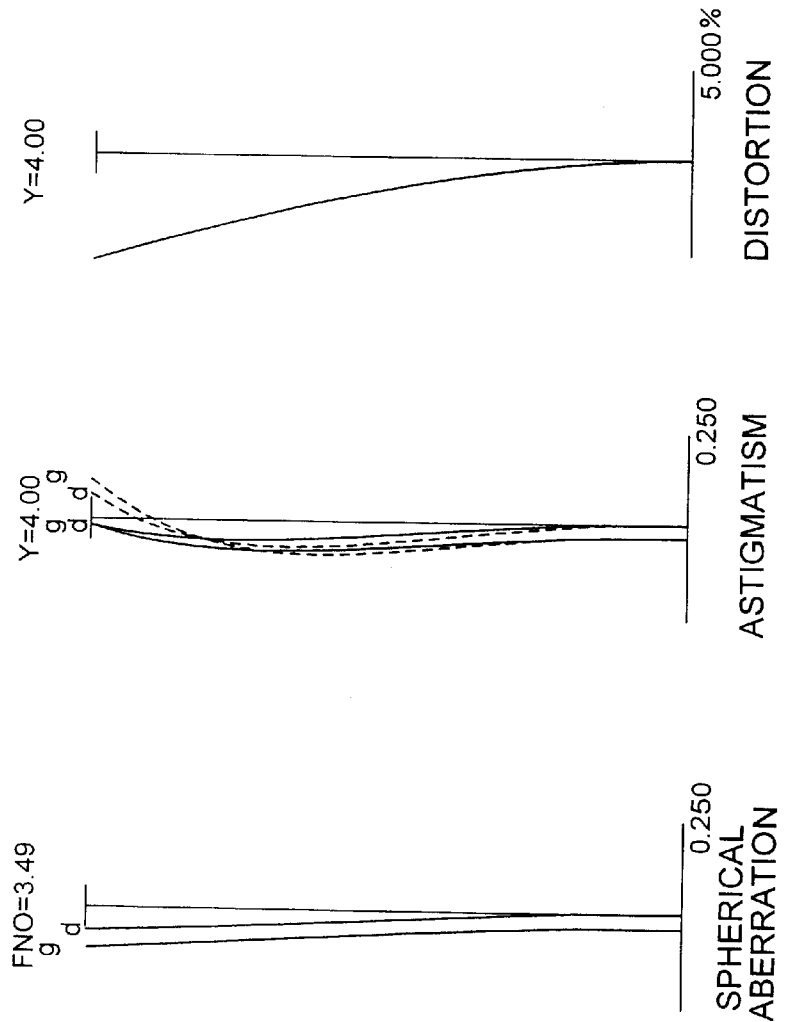

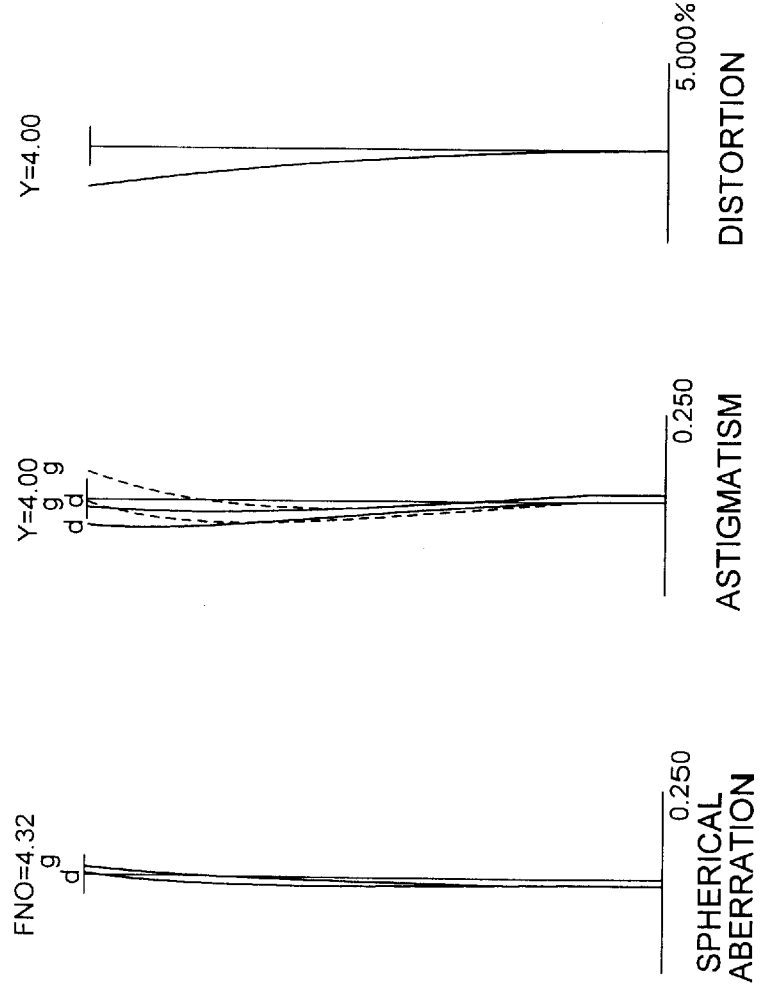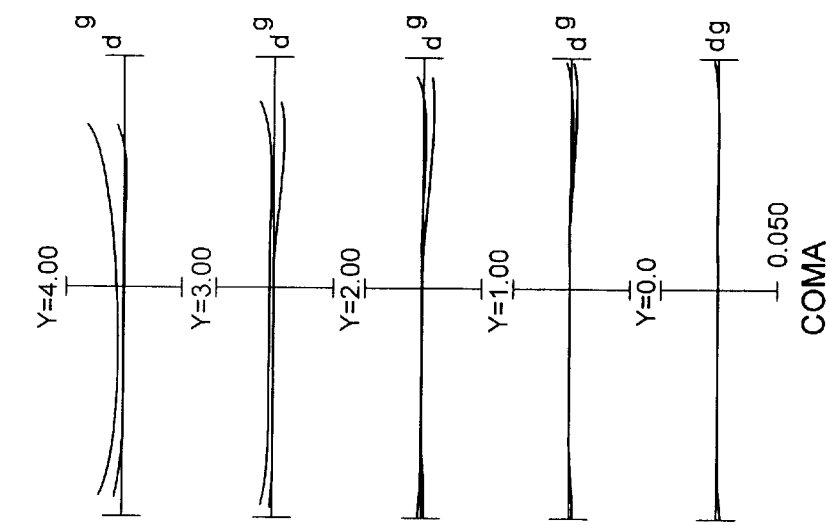

FIG. 20A FIG. 20B FIG. 20C FIG. 20D FIG. 20E

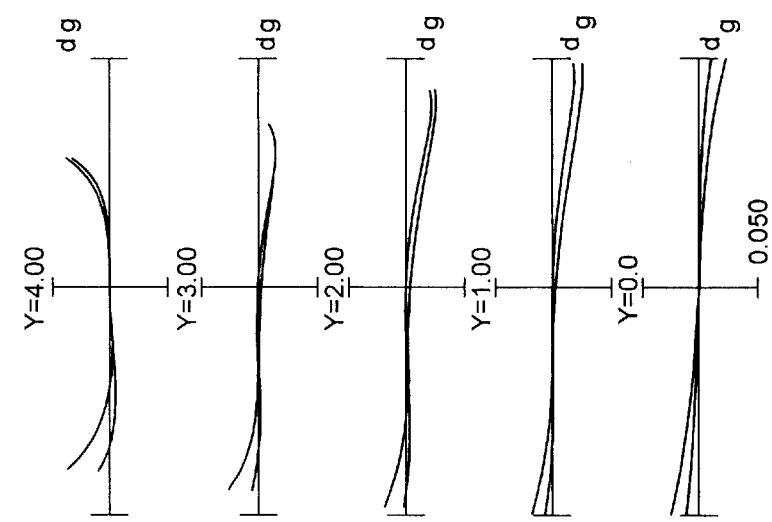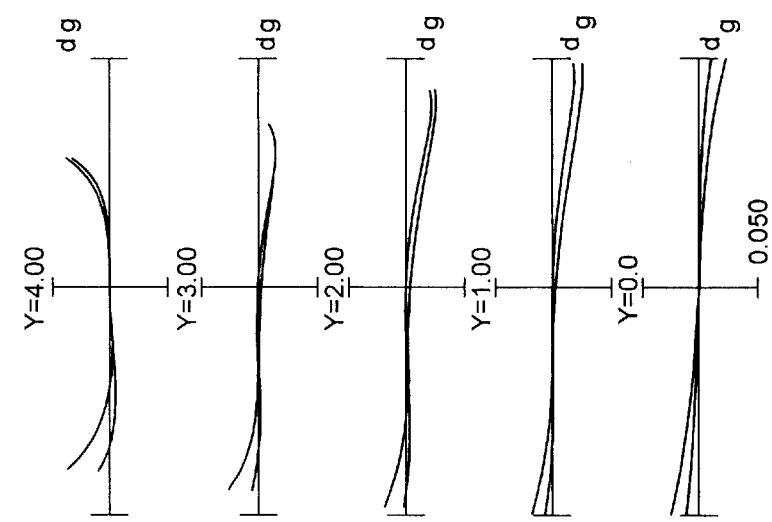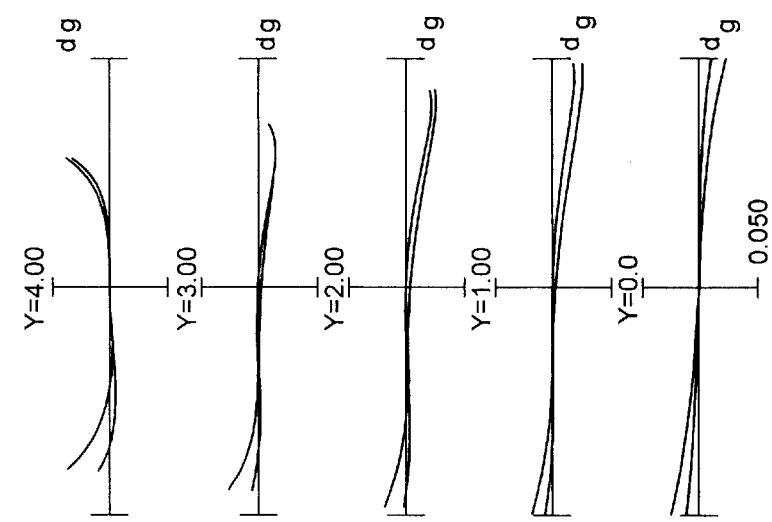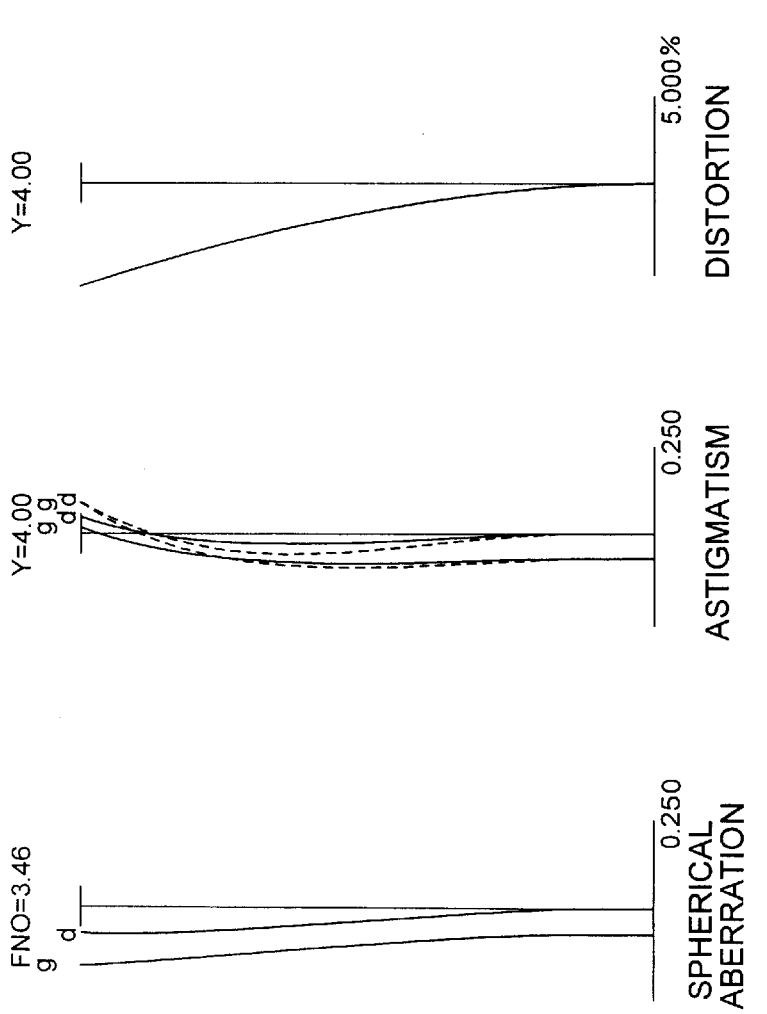

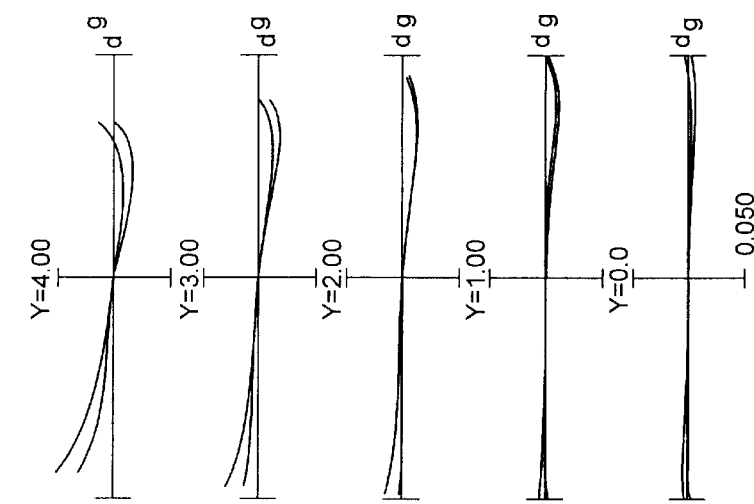
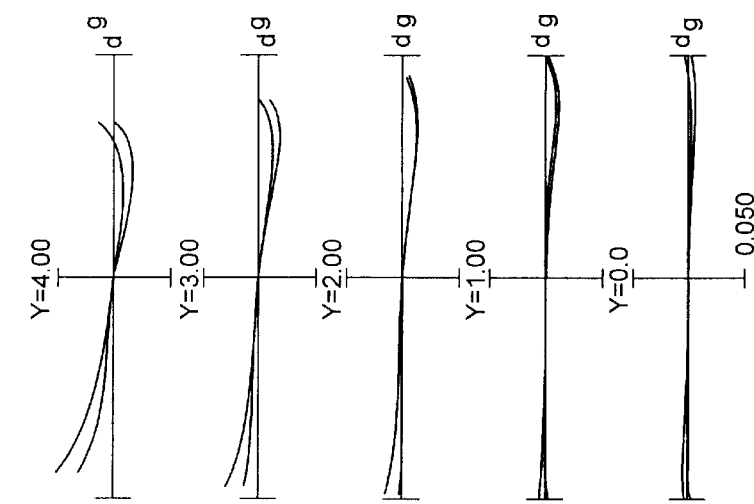
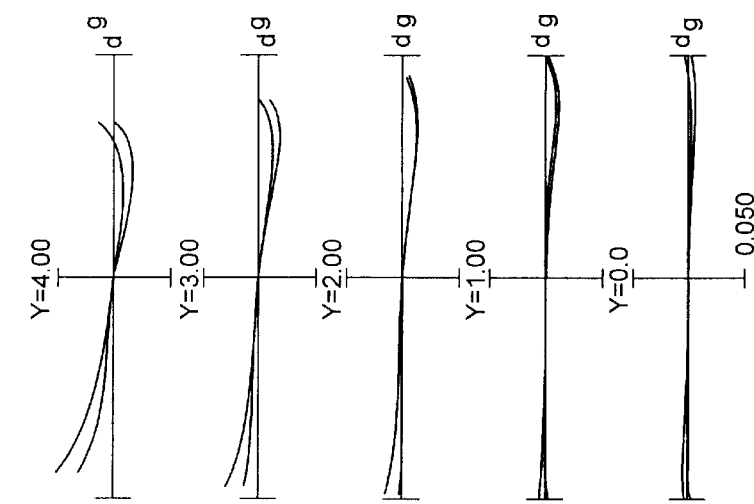
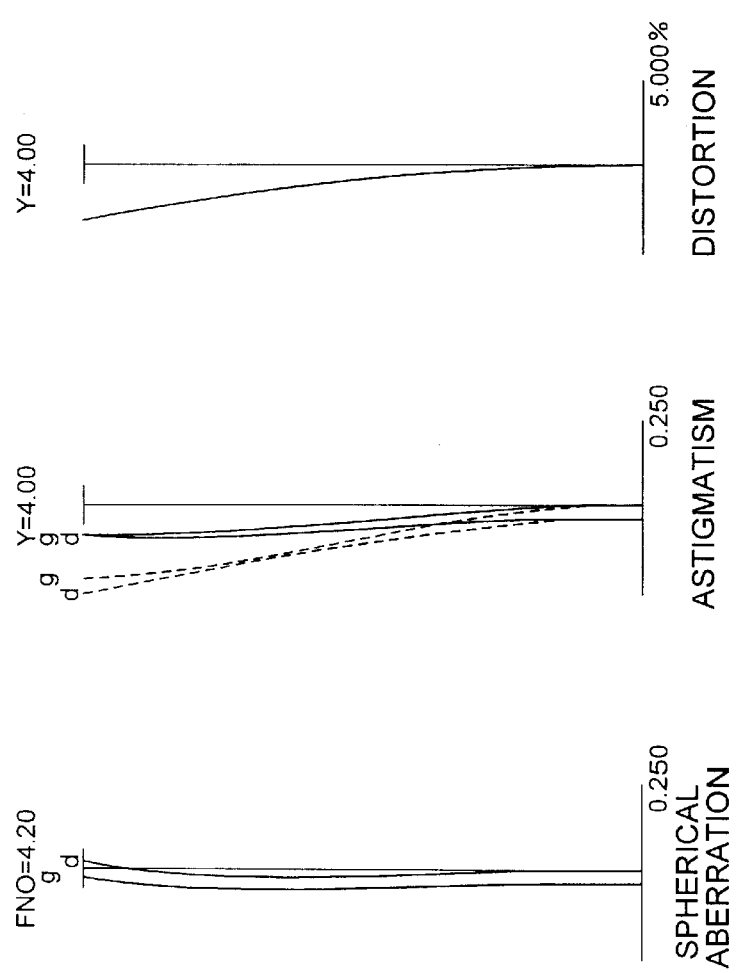
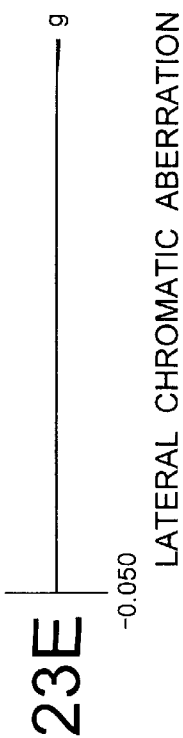

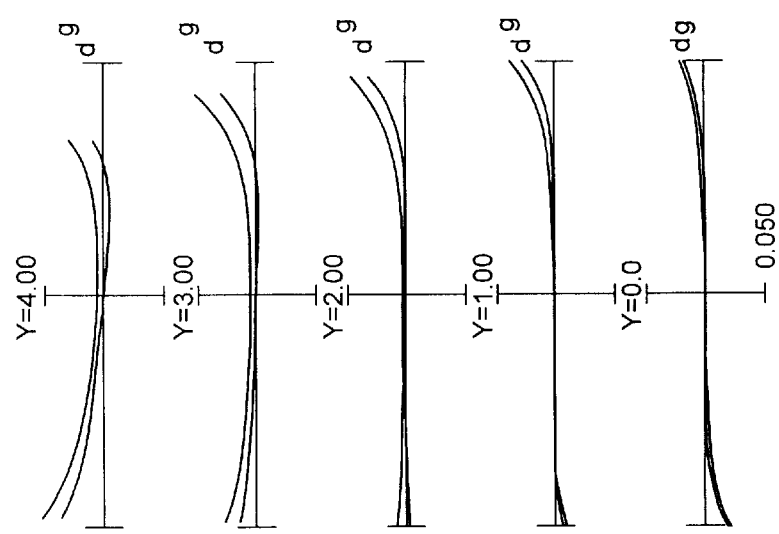
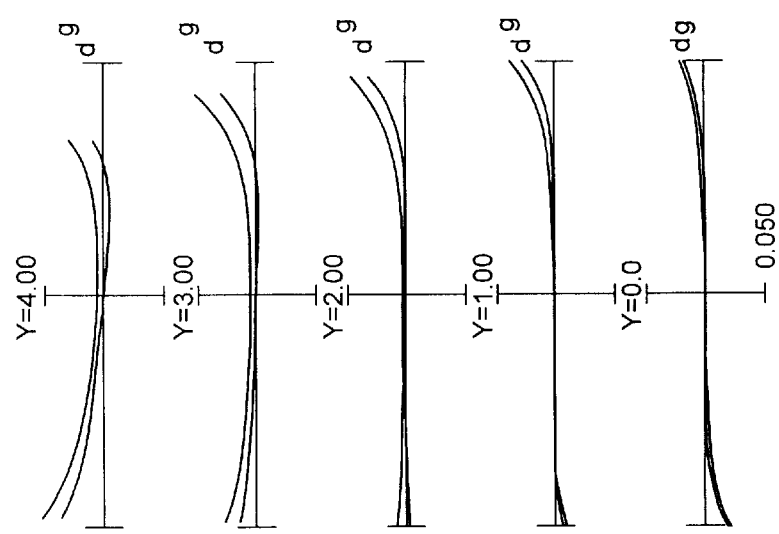
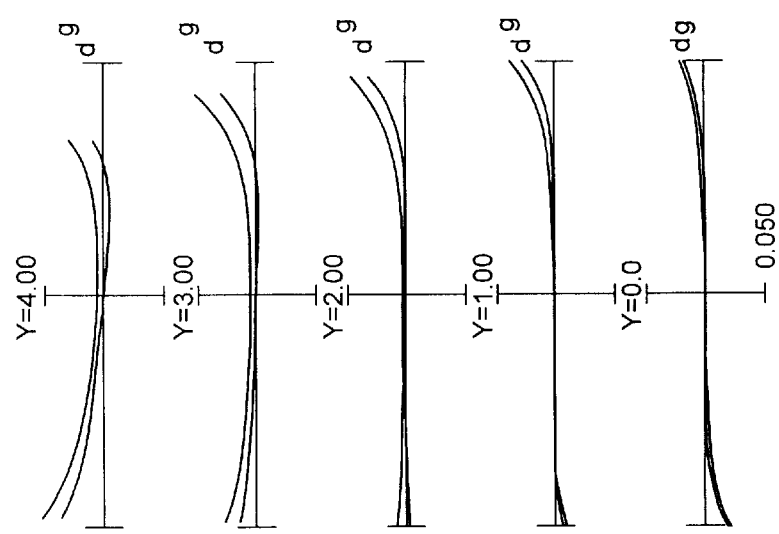
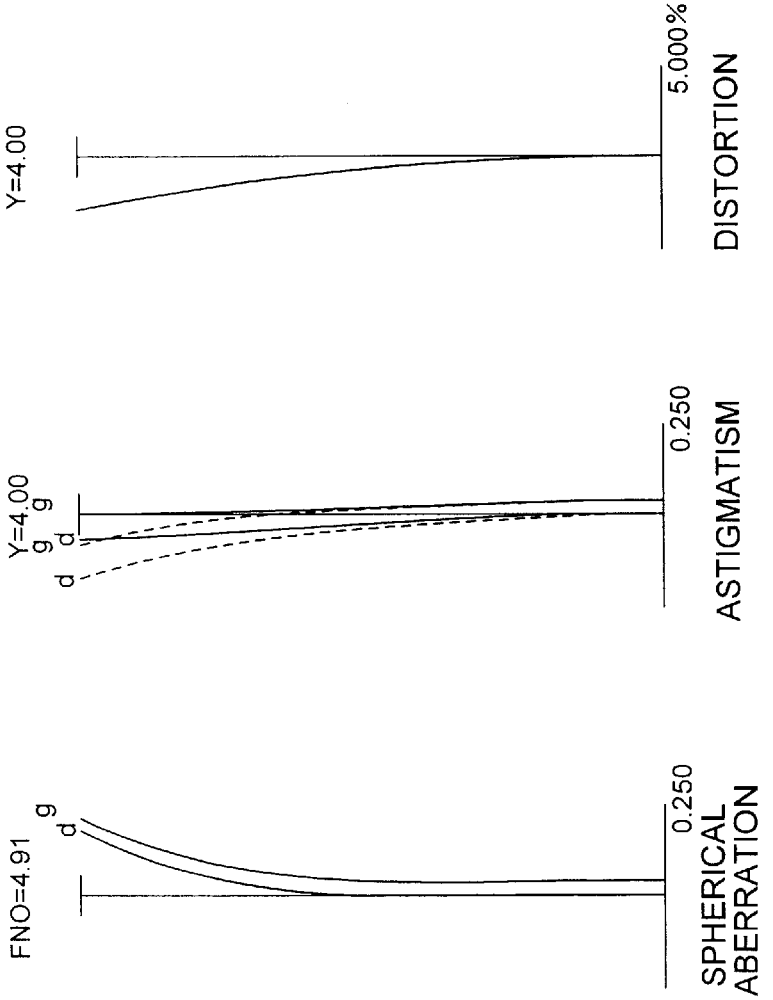
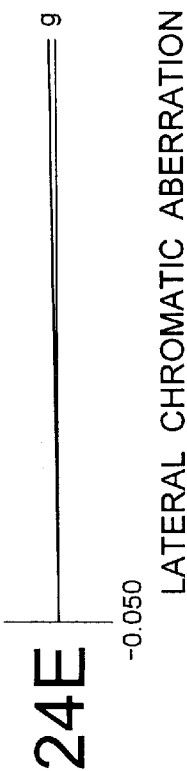

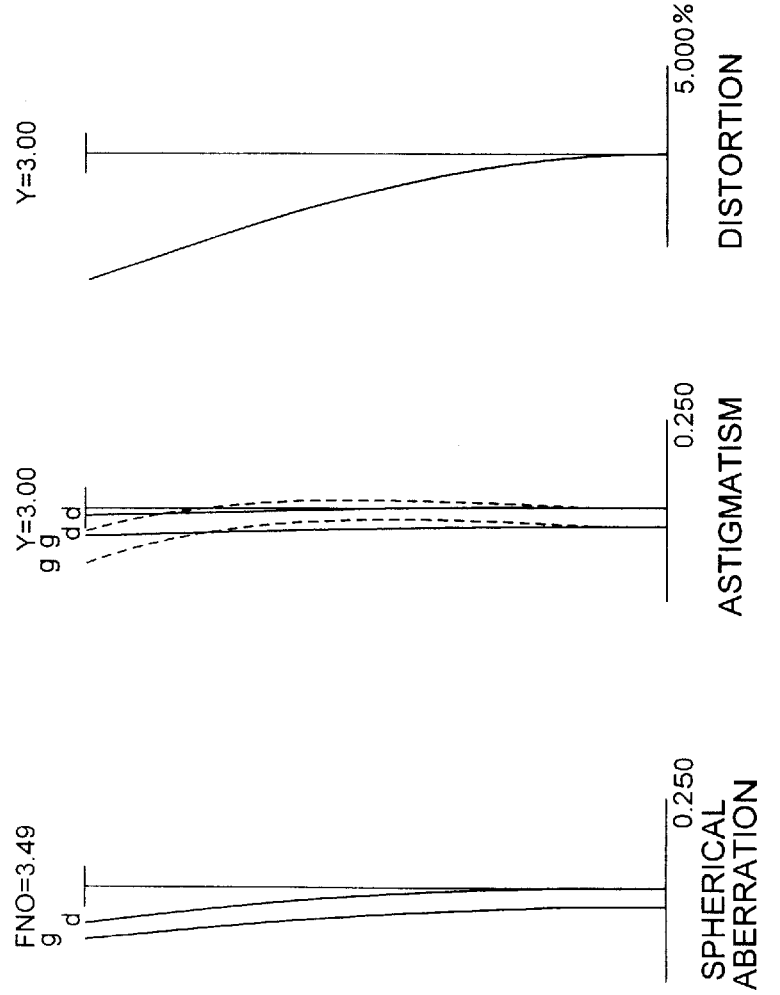
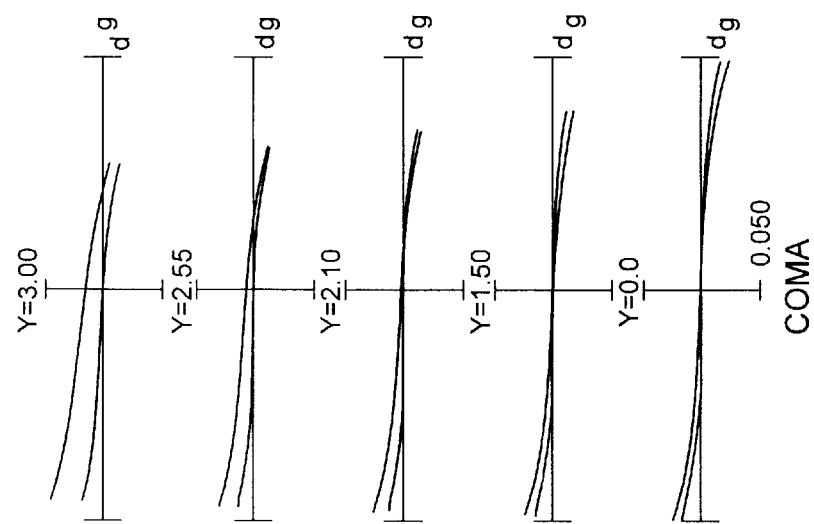

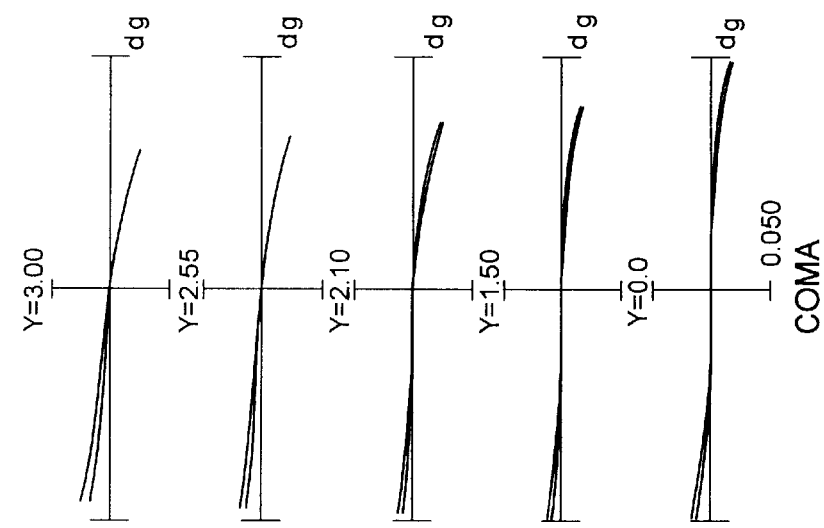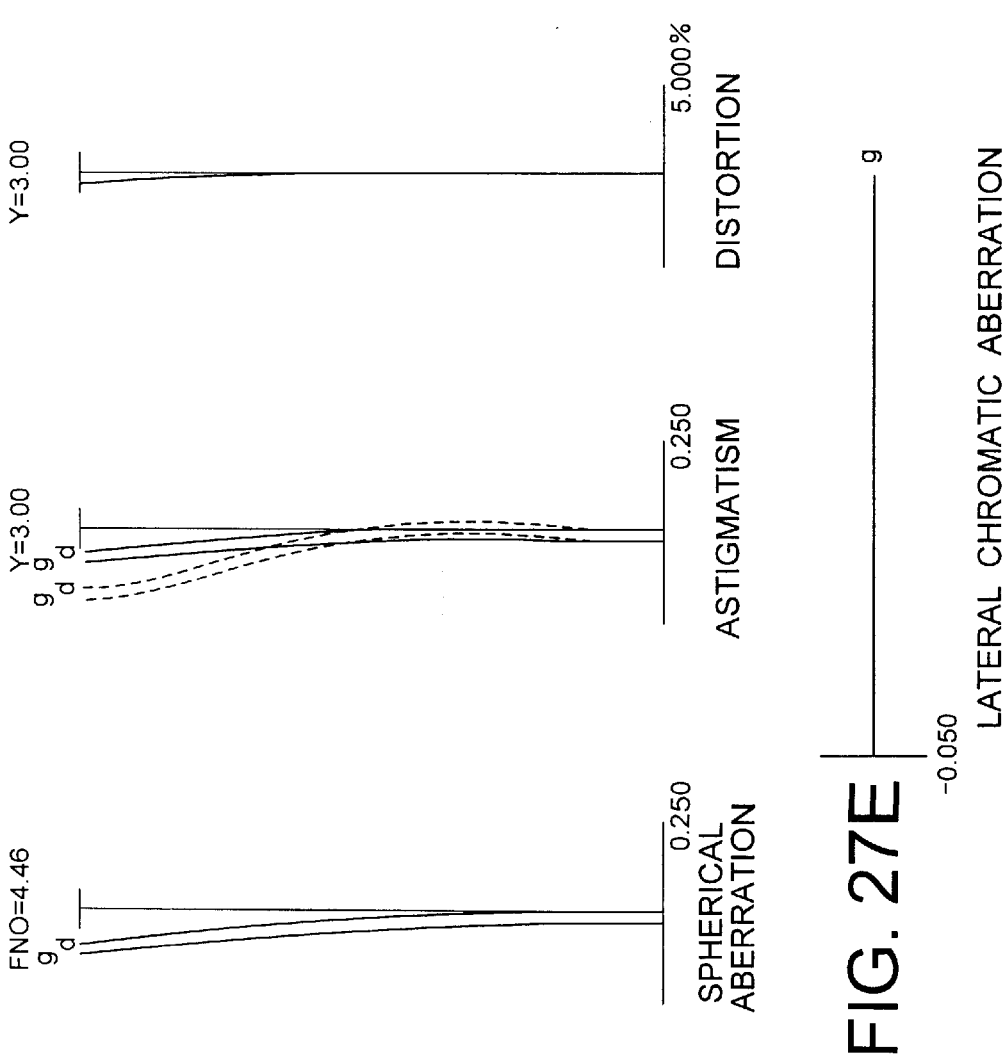

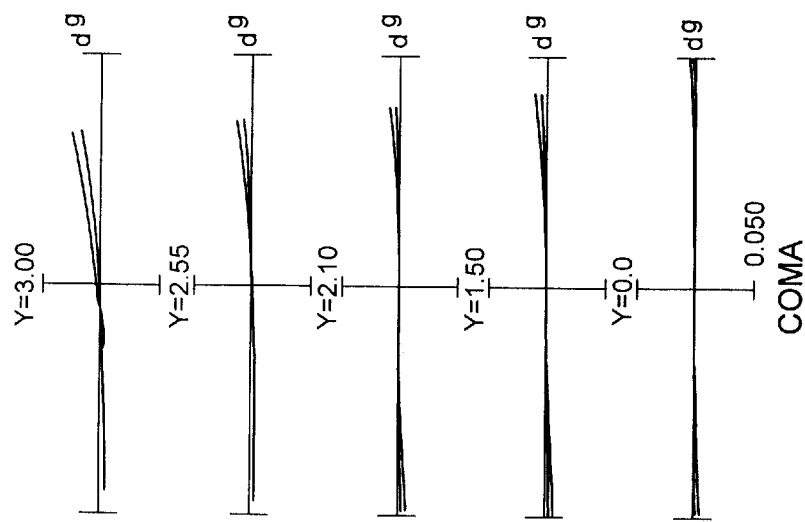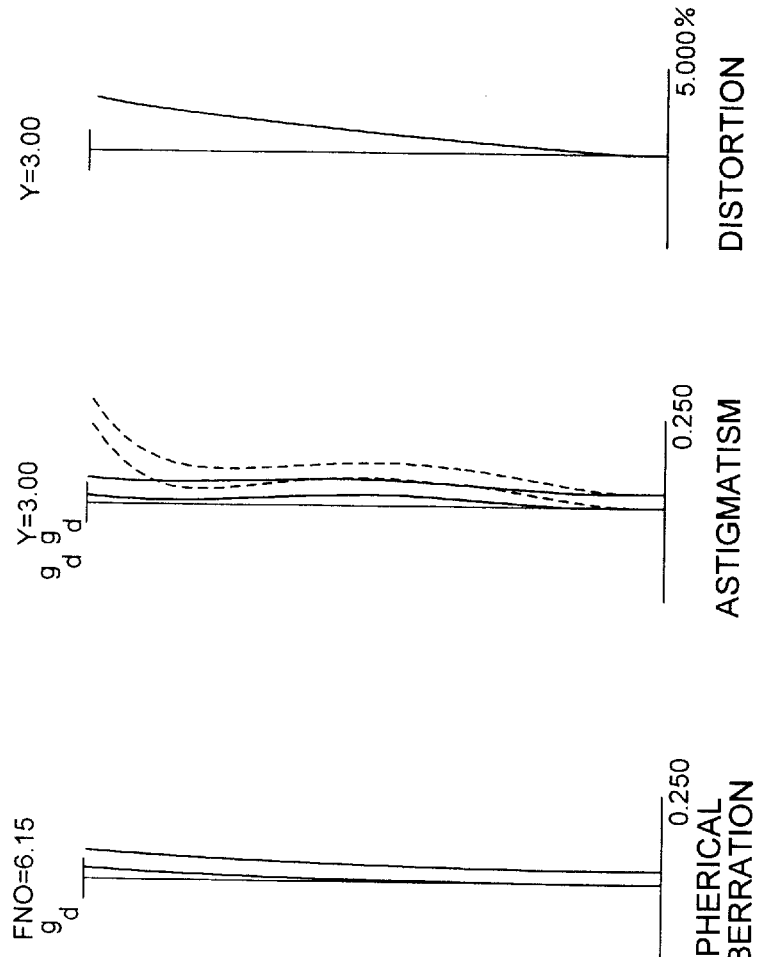

VARIABLE FOCAL LENGTH LENS SYSTEM AND IMAGING APPARATUS EQUIPPED WITH THEREOF

INCORPORATION BY REFERENCE

The disclosures of the following priority applications are herein incorporated by reference: Japanese Patent Application No. 11-120047 filed Apr. 27, 1999; Japanese Patent Application No. 2000-053980 filed Feb. 29, 2000.

FIELD OF THE INVENTION

The present invention relates to variable focal length lens systems, and, in particular, to variable focal length lens system suitable for use with a video camera or a digital still camera employing solid-state imaging device and the like, and relates to imaging apparatus equipped with the lens system.

BACKGROUND OF THE INVENTION

Variable focal length lens systems with three-group configuration having negative-positive-positive refractive power arrangement suitable for solid-state imaging device have been disclosed in the Japanese Patent Laid-Open Publication No. 64-40913 and in the Japanese Patent Laid-Open Publication No. 6-94996, etc.

In each embodiment disclosed in the Japanese Patent Laid-Open Publication No. 64-40913, since the third lens group is configured with three or four lens elements, there are problems that the construction of the lens barrel for the third lens group becomes complicated and that it takes time for assembling and adjusting. Further, in each embodiment disclosed in the Japanese Patent Laid-Open Publication No. 6-94996, since the first lens group is configured with three lens elements, there are problems that the construction of the lens barrel for the first lens group becomes complicated and that it takes time for assembling and adjusting.

The present invention is made in view of the aforementioned problems and has an object to provide a variable focal length lens system with low cost, suitable for use with a video camera or a digital still camera employing solid-state imaging device, capable of assembling and adjusting with ease, and to provide an imaging apparatus equipped with the lens system.

SUMMARY OF THE INVENTION

In order to solve the problems, a variable focal length lens system according to the present invention has; in order from an object side, a first lens group having a negative refractive power, a second lens group having a positive refractive power, and a third lens group having a positive refractive power, wherein the first lens group consists of a cemented negative lens component, the second lens group comprises two positive lens elements and at least one negative lens element, and the third lens group consists of a single lens component, and wherein a space between the first and second lens groups is decreased and a space between the second and third lens groups is increased when a state of the lens group positions is changed from a wide-angle end state (a state providing the shortest focal length of the lens system) to a telephoto end state (a state providing the longest focal length of the lens system).

By providing a first lens group consisting of a single cemented negative lens component and a third lens group consisting of a single lens component, the assembling and adjusting of the first and third lens group become quite easy, and it is also effective for cost saving. Further, by providing a second lens group comprising two positive lens elements and at least one negative lens element, spherical aberration and coma can be well corrected.

It is further preferable that the cemented negative lens component is a cemented lens consisting of, in order from the object side, a positive lens element, and a negative lens element having double concave surfaces.

It is more preferable to satisfy conditional equation (1) shown below;

$$v1N - v1P > 20 \quad (1)$$

where $v1N$ denotes Abbe number of the negative lens element in the first lens group and $v1P$ denotes Abbe number of the positive lens element in the first lens group.

Conditional equation (1) defines a preferable state where on-axis and lateral chromatic aberration is well corrected within whole variable focal length area. When the value $v1N-v1P$ falls below the lower limit of conditional equation (1), it is not preferable that on-axis or lateral chromatic aberration becomes worse.

Further, in the present invention, it is desirable to satisfy conditional equation (2) shown below;

$$-2.5 < (R3+R1)/(R3-R1) < -0.5 \quad (2)$$

where $R1$ denotes a radius of curvature on the object side surface of the cemented negative lens component, and $R3$ denotes a radius of curvature on the image side surface of the cemented negative lens component.

Conditional equation (2) defines a preferable shape of the cemented negative lens component composing. the first lens group. When the value $(R3+R1)/(R3-R1)$ exceeds the upper limit of conditional equation (2), the object side surface of the cemented negative lens component becomes strong concave surface, and it becomes difficult to correct astigmatism and distortion well. On the contrary, when the value falls below the lower limit of conditional equation (2), spherical aberration produced on the cemented surface becomes excessive, and correction of spherical aberration in the whole lens system becomes difficult.

Further, in the present invention, it is desirable that the third lens group consists of only a single positive lens element having double convex surfaces. It also helps for performing cost saving.

Furthermore, in the present invention, it is desirable that the third lens group consists of a single cemented positive lens component consisting of a positive lens element having double convex surfaces and a negative lens element having meniscus shape. With this configuration, on-axis and lateral chromatic aberrations can be corrected more preferably.

Further, in the present invention, it is desirable that the second lens group consists of, in order from the object side, two positive lens elements and one negative lens element. With this configuration, spherical aberration and coma can be corrected effectively.

Furthermore, in the present invention, it is desirable that the second lens group consists of, in order from the object side, a positive lens element and a cemented negative lens component wherein the cemented negative lens component consists of, in order from the object side, a positive lens element having double convex surfaces and a negative lens element having double concave surfaces. With this configuration, the construction of the second lens group can be simplified, and both spherical aberration and come can be corrected simultaneously.

Furthermore, in the present invention, it is possible for the second lens group to configure, in order from the object side, a positive lens element having double convex surfaces, a negative lens element having double concave surfaces, and a positive lens element having a concave surface facing to the object side.

Furthermore, in the present invention, it is desirable for the second lens group to consist of, in order from the object side, two positive lens elements, a negative lens element, and a meniscus lens element having a concave surface facing to the object side. With this configuration, spherical aberration and coma can be corrected effectively. Further, by suitably choosing the thickness of the meniscus lens element, the optimum exit pupil position for a CCD used in an imaging apparatus equipped with a variable focal length lens system according to the present invention can be realized.

Further, in the present invention, it is desirable for the second lens group to consist of, in order from the object side, a positive lens element, a cemented negative lens component and a meniscus lens element having a concave surface facing to the object side, wherein the cemented negative lens component consists of, in order from the object side, a positive lens element having double convex surfaces and a negative lens element having double concave surfaces. With this configuration, spherical aberration and coma can be corrected well, and it is possible to mitigate both spacing and decentering tolerance in the second lens group simultaneously.

Further, in the present invention, it is desirable to satisfy following conditional equations (3) and (4);

$$2<|f1/fw|<3.2 \text{(where } f1<0) \quad (3)$$

$$0.8<f3/f2<1.6 \quad (4)$$

where fw denotes a focal length of the variable focal length lens system in the wide-angle end state, f2 denotes a focal length of the second lens group, and f3 denotes a focal length of the third lens group respectively.

Conditional equation (3) defines an appropriate range of the focal length of the first lens group. When the ratio |f1/fw| falls below the lower limit of conditional equation (3), it is not desirable that spherical aberration produced in the first lens group becomes large, and that variation of spherical aberration in accordance with zooming becomes large. On the contrary, when the ratio exceeds the upper limit of conditional equation (3), it is not desirable that the lens system becomes large, and securing sufficient zooming ratio becomes difficult.

Conditional equation (4) defines an appropriate range of a ratio of the focal length of the second lens group to that of the third lens group. When the ratio falls below the lower limit of conditional equation (4), it is undesirable that spherical aberration and coma produced in the second lens group becomes excessively large. On the contrary, when the ratio exceeds the upper limit of conditional equation (4), the refractive power of the second lens group becomes large, and, as a result, it becomes difficult to correct aberration produced in the second lens group, or the configuration of the second lens group becomes complicated. It is undesirable.

Further, in the present invention, the first lens group moves, the second lens group moves to the object side, and the third lens group is preferably fixed when a state of the lens group position is changed from the wide-angle end state to the telephoto end state. As a result, the zooming mechanism can be simplified.

Further, the present invention is not limited to aforementioned configuration, and the zooming mechanism can also be simplified in such a configuration that the first lens group is fixed, the second lens group moves to the object side, and the third lens group moves when a state of the lens group position is changed from the wide-angle end state to the telephoto end state.

Further, it is desirable that the first lens group is moved to the object side when the focusing operation is performed from a far object to a near object. As a result, degradation of optical quality accompanied with focusing operation can be minimized.

Further, the present invention provides an imaging apparatus having a variable focal length lens system and an imaging device configured such that an image formed by the variable focal length lens system is detected by the imaging device. The variable focal length lens system is arranged, in order from the object side, a first lens group having a negative refractive power, a second lens group having a positive refractive power, and a third lens group having a positive refractive power, wherein the first lens group consists of a cemented negative lens component, the second lens group comprises two positive lens elements and at least one negative lens element, and the third lens group consists of a single lens component, and wherein, in order to maintain imaging state, the first and third lens groups are fixed, the second lens group is moved to the object side, and the imaging device is moved when a state of the lens group positions is changed from the wide-angle end state to the telephoto end state. In this configuration, the zooming mechanism can be simplified.

Further, in the present invention, it is desirable that the imaging device is moved in the opposite direction to the object side when the focusing operation is performed from a far object to a near object. As a result, the moving mechanism of the imaging device can be used for both zooming and focusing.

BRIEF DESCRIPTION OF THE DRAWINGS

FIG. 1 is a view schematically showing the lens configuration of the first embodiment of the variable focal length lens system according to the present invention.

FIGS. 2A–2E show various aberrations of the first embodiment according to the present invention in the wide-angle end state.

FIGS. 3A–3E show various aberrations of the first embodiment according to the present invention in the intermediate focal length state.

FIGS. 4A–4E show various aberrations of the first embodiment according to the present invention in the telephoto end state.

FIGS. 6A–6E show various aberrations of the second embodiment according to the present invention in the wide-angle end state.

FIGS. 7A–7E show various aberrations of the second embodiment according to the present invention in the intermediate focal length state.

FIGS. 8A–8E show various aberrations of the second embodiment according to the present invention in the telephoto end state.

FIG. 9 is a view schematically showing the lens configuration of the third embodiment of the variable focal length lens system according to the present invention.

FIGS. 10A–10E show various aberrations of the third embodiment according to the present invention in the wide-angle end state.

FIGS. 11A–11E show various aberrations of the third embodiment according to the present invention in the intermediate focal length state.

FIGS. 12A–12E show various aberrations of the third embodiment according to the present invention in the telephoto end state.

FIGS. 14A–14E show various aberrations of the fourth embodiment according to the present invention in the wide-angle end state.

FIGS. 15A–15E show various aberrations of the fourth embodiment according to the present invention in the intermediate focal length state.

FIGS. 16A–16E show various aberrations of the fourth embodiment according to the present invention in the telephoto end state.

FIG. 17 is a view schematically showing the lens configuration of the fifth embodiment of the variable focal length lens system according to the present invention.

FIGS. 18A–18E show various aberrations of the fifth embodiment according to the present invention in the wide-angle end state.

FIGS. 19A–19E show various aberrations of the fifth embodiment according to the present invention in the intermediate focal length state.

Figures 20A, 20B, 20C, 20D, 20E:
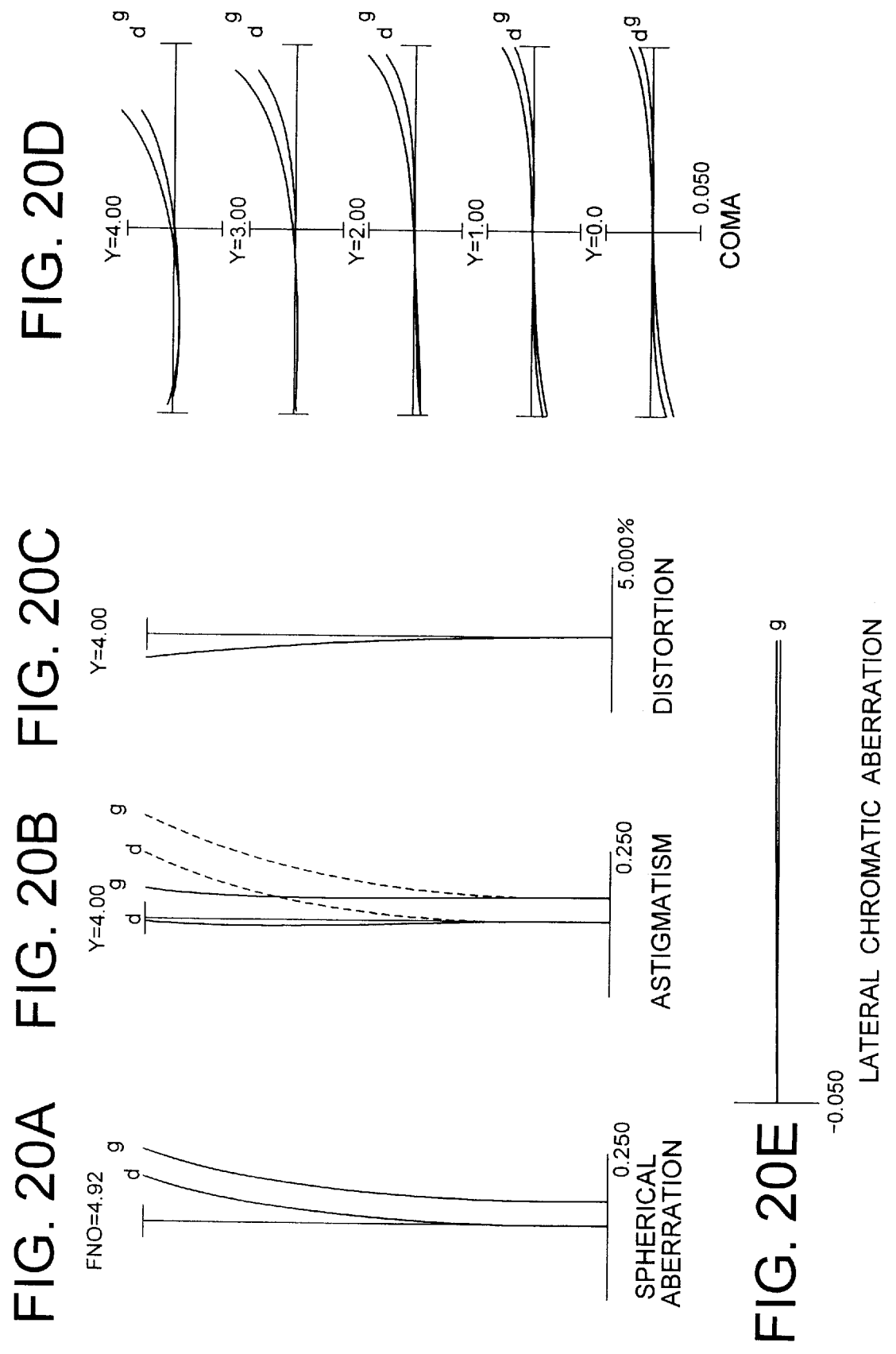

FIGS. 20A–20E show various aberrations of the fifth embodiment according to the present invention in the telephoto end state.

FIGS. 22A–22E show various aberrations of the sixth embodiment according to the present invention in the wide-angle end state.

FIGS. 23A–23E show various aberrations of the sixth embodiment according to the present invention in the intermediate focal length state.

FIGS. 24A–24E show various aberrations of the sixth embodiment according to the present invention in the telephoto end state.

FIGS. 26A–26E show various aberrations of the seventh embodiment according to the present invention in the wide-angle end state.

FIGS. 27A–27E show various aberrations of the seventh embodiment according to the present invention in the intermediate focal length state.

FIGS. 28A–28E show various aberrations of the seventh embodiment according to the present invention in the telephoto end state.

DESCRIPTION OF PREFERRED EMBODIMENT

Figure 5:
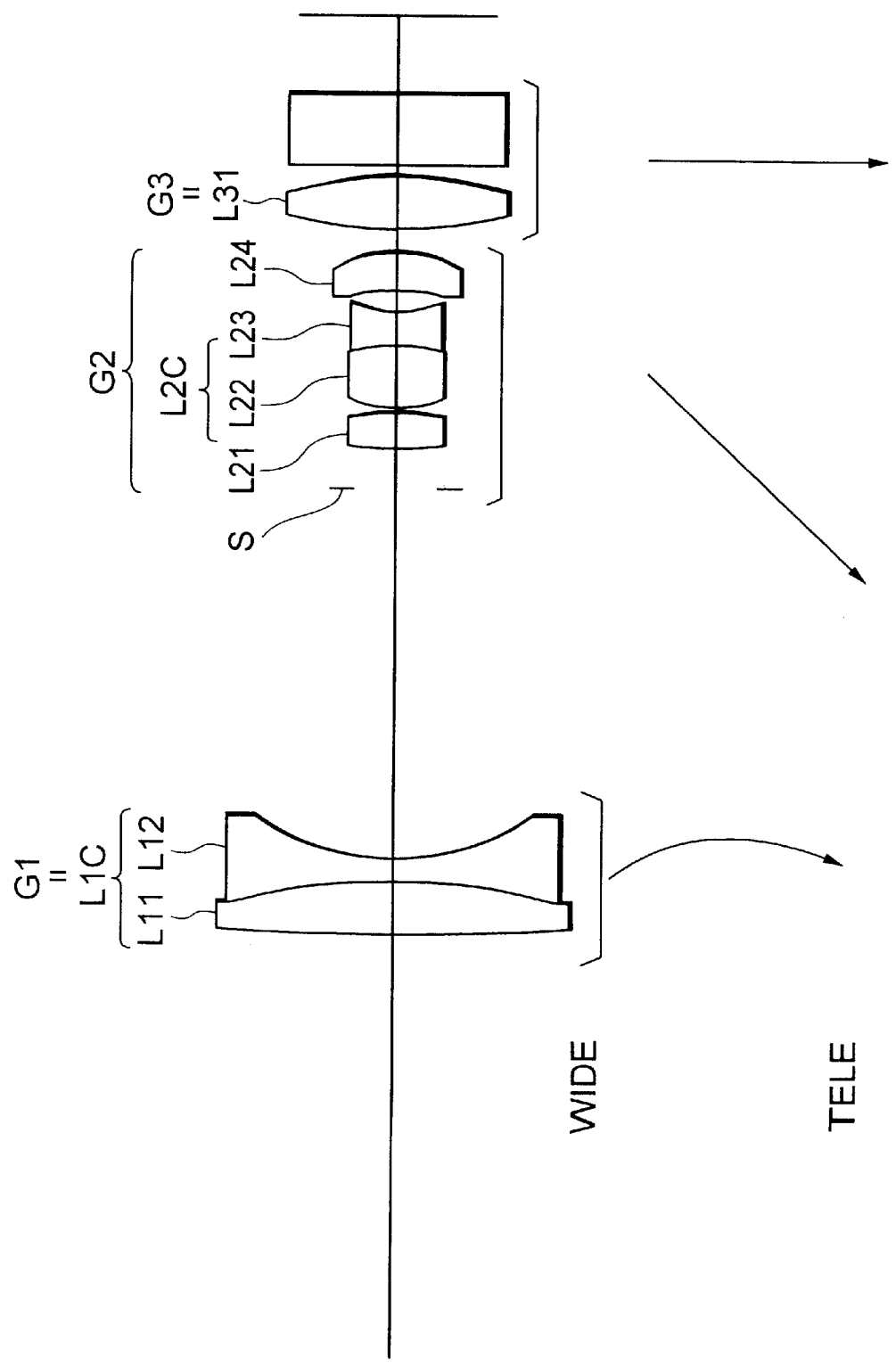
FIG. 5 is a view schematically showing the lens configuration of the second embodiment of the variable focal length lens system according to the present invention.

Numerical embodiments of the present invention will be described below with reference to attached drawings.

The First Embodiment

FIG. 1 is a view schematically showing the lens configuration of the first embodiment. It has, in order from an object side, a first lens group G1 having a negative refractive power, an aperture diaphragm S, a second lens group G2 having a positive refractive power, and a third lens group G3 having a positive refractive power, wherein the first and second lens groups are moved such that tween the first and second lens groups is decreased and a space between the second and third lens groups is increased when a state of the lens group positions is changed from a wide-angle end state (a state providing the shortest focal length of the lens system) to a telephoto end state (a state providing the longest focal length of the lens system), and the third lens group is fixed.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, a cemented negative lens component L2C, and a positive meniscus lens element L24 having a concave surface facing to the object side, wherein the cemented negative lens component L2C consists of, in order from the object side, a positive lens element L22 having double convex surfaces, and a negative lens element L23 having double concave surfaces.

The third lens group G3 consists of a positive lens element L31 having double convex surfaces. The first lens group G1 is moved to the object direction when the focusing operation is performed from a far object to a near object.

Various values associated with the first embodiment are listed in Table 1 shown below. In "Values on the whole", f denotes the focal length, B.f. denotes the back focal length, FNO denotes the f-number, 2ω denotes an angle of view. In "Lens Data", the first column shows lens surface number, in order from the object side, the second column r shows radius of curvature of lens surface, the third column d shows distance between lens surfaces, the fourth column ν shows Abbe number, and the fifth column n shows refractive index for the d-line ($\lambda$=587.6 nm) respectively. In "Variable Distance Data", the focal length and variable distance in the wide-angle end state, intermediate focal length state, and telephoto end state are shown. In "Values for the conditions", various values for the parameters in each condition are shown. By the way, the similar symbols used in this embodiment are used for various values in all embodiments following this.

TABLE 1

[Values on the whole]

|  | Wide-Angle end | Intermediate | Telephoto end |
|---|---|---|---|
| f | 7.200 | 10.000 | 13.700 |
| Bf = 3.340 | | | |
| FNO | 3.65 | 4.30 | 5.17 |
| 2ω | 61.09° | 44.53° | 33.05° |

[Lens Data]

| | r | d | ν | n |
|---|---|---|---|---|
| 1 | 250.7205 | 2.5000 | 23.8 | 1.84666 |
| 2 | −33.0184 | 1.1000 | 53.9 | 1.71300 |
| 3 | 11.6616 | (d3) | | |
| 4 | ∞ | 1.8000 | | aperture diaphragm |
| 5 | 23.8807 | 1.7000 | 54.7 | 1.72916 |
| 6 | −15.9672 | 0.2000 | | |
| 7 | 5.6032 | 3.0000 | 35.7 | 1.62588 |
| 8 | −12.0778 | 1.6000 | 23.8 | 1.84666 |
| 9 | 4.2680 | 1.1000 | | |
| 10 | −9.4109 | 3.0000 | 54.7 | 1.72916 |
| 11 | −8.8798 | (d11) | | |
| 12 | 21.9677 | 2.5000 | 54.7 | 1.72916 |

TABLE 1-continued

| 13 | −21.9677 | 0.5000 | | |
|---|---|---|---|---|
| 14 | ∞ | 3.3400 | 64.1 | 1.51680 |
| 15 | ∞ | | | |

[Variable Distance Data]

| | Wide-Angle end | Intermediate | Telephoto end |
|---|---|---|---|
| f | 7.20015 | 10.00000 | 13.70000 |
| d3 | 17.49999 | 11.72115 | 7.70760 |
| d11 | 1.01690 | 4.75965 | 9.70568 |

[Values for the conditions]
(1) ν1N − ν1P = 30.1
(2) (R3 + R1)/(R3 − R1) = −1.10
(3) |f1/fw| = 2.61
(4) f3/f2 = 1.10

FIGS. 2A–2E show various aberrations of the first embodiment according to the present invention in the wide-angle end state. FIGS. 3A–3E show various aberrations of the embodiment in the intermediate focal length state. FIGS. 4A–4E show various aberrations of the embodiment in the telephoto end state. In each aberration chart, FNO denotes F-number, ω denotes angle of view, d denotes d-line (λ=587.6 nm), g denotes g-line (λ=435.6 nm) respectively. In the diagrams showing astigmatism, a solid line indicates a sagittal image plane and a broken line indicates a meridional plane. The similar symbols used in this embodiment are used in all diagrams showing aberrations of all embodiments. As is apparent from the respective diagrams showing the various aberrations, excellent correction is made for the various aberrations and good imaging quality is obtained.

The Second Embodiment

FIG. 5 is a view schematically showing the lens configuration of the second embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the first and second lens groups are moved such that a space between the first and second lens groups is decreased and a space between the second and third lens groups is increased when a state of the lens group positions is changed from a wide-angle end state to a telephoto end state, and the third lens group is fixed.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, a cemented negative lens component L2C, and a positive meniscus lens element L24 having a concave surface facing to the object side, wherein the cemented negative lens component L2C consists of, in order from the object side, a positive lens element L22 having double convex surfaces, and a negative lens element L23 having double concave surfaces.

The third lens group G3 consists of a positive lens element L31 having double convex surfaces. The first lens group G1 is moved to the object direction when the focusing operation is performed from a far object to a near object.

Various values associated with the second embodiment are listed in Table 2.

TABLE 2

[Values on the whole]

| | Wide-Angle end | Intermediate | Telephoto end |
|---|---|---|---|
| f | 7.20 | 10.000 | 13.700 |

Bf = 3.568

| | Wide-Angle end | Intermediate | Telephoto end |
|---|---|---|---|
| FNO | 3.67 | 4.31 | 5.18 |
| 2ω | 61.00° | 44.56° | 33.10° |

[Lens Data]

| | r | d | ν | n |
|---|---|---|---|---|
| 1 | 237.2521 | 2.5000 | 23.8 | 1.84666 |
| 2 | −28.9347 | 1.1000 | 53.9 | 1.71300 |
| 3 | 11.4722 | (d3) | | |
| 4 | ∞ | 1.8000 | | aperture diaphragm |
| 5 | 37.5717 | 1.7000 | 52.7 | 1.74100 |
| 6 | −15.3275 | 0.2000 | | |
| 7 | 5.5549 | 3.0000 | 60.1 | 1.64000 |
| 8 | −9.4581 | 1.6000 | 35.0 | 1.80100 |
| 9 | 4.2146 | 1.0000 | | |
| 10 | −6.6605 | 1.8000 | 70.2 | 1.48749 |
| 11 | −6.1884 | (d11) | | |
| 12 | 19.7840 | 2.5000 | 60.1 | 1.64000 |
| 13 | −19.7840 | 0.5000 | | |
| 14 | ∞ | 3.3400 | 64.1 | 1.51680 |
| 15 | ∞ | | | |

[Variable Distance Data]

| | Wide-Angle end | Intermediate | Telephoto end |
|---|---|---|---|
| f | 7.20000 | 10.00000 | 13.70000 |
| d3 | 17.68270 | 12.09583 | 8.21591 |
| d11 | 1.10865 | 4.82669 | 9.73982 |

[Values for the conditions]
(1) ν1N − μ1P = 30.1
(2) (R3 + R1)/(R3 − R1) = −1.10
(3) |f1/fw| = 2.60
(4) f3/f2 = 1.15

FIGS. 6A–6E show various aberrations of the second embodiment according to the present invention in the wide-angle end state. FIGS. 7A–7E show various aberrations of the embodiment in the intermediate focal length state. FIGS. 8A–8E show various aberrations of the embodiment in the telephoto end state. As is apparent from the respective diagrams showing the various aberrations, excellent correction is made for the various aberrations and good imaging quality is obtained.

The Third Embodiment

FIG. 9 is a view schematically showing the lens configuration of the third embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the first and second lens groups are moved such that a space between the first and second lens groups is decreased and a space between the second and third lens groups is increased when a state of the lens group positions is changed from a wide-angle end state to a telephoto end state, and the third lens group is fixed.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, and a cemented negative lens component L2C, wherein the cemented negative lens component L2C consists of, in order from the object side, a positive lens element L22 having double convex surfaces, and a negative lens element L23 having double concave surfaces.

The third lens group G3 consists of a positive lens element L31 having double convex surfaces. The first lens group G1 is moved to the object direction when the focusing operation is performed from a far object to a near object.

Various values associated with the third embodiment are listed in Table 3.

TABLE 3

[Values on the whole]

| | Wide-Angle end | Intermediate | Telephoto end |
|---|---|---|---|
| f | 7.200 | 10.000 | 13.700 |
| Bf = 3.319 | | | |
| FNO | 3.97 | 4.73 | 5.72 |
| 2ω | 61.51° | 44.82° | 33.13° |

[Lens Data]

| | r | d | ν | n |
|---|---|---|---|---|
| 1 | 61.1207 | 2.5000 | 23.8 | 1.84666 |
| 2 | −49.4275 | 1.1000 | 53.9 | 1.71300 |
| 3 | 9.9060 | (d3) | | |
| 4 | ∞ | 1.8000 | | aperture diaphragm |
| 5 | 16.9795 | 1.7000 | 54.7 | 1.72916 |
| 6 | −22.6095 | 0.2000 | | |
| 7 | 6.3449 | 3.0000 | 60.1 | 1.64000 |
| 8 | −13.2839 | 1.6000 | 35.0 | 1.80100 |
| 9 | 4.4228 | (d9) | | |
| 10 | 14.9972 | 2.5000 | 60.1 | 1.64000 |
| 11 | −29.2900 | 0.5000 | | |
| 12 | ∞ | 3.3400 | 64.1 | 1.51680 |
| 13 | ∞ | | | |

[Variable Distance Data]

| | Wide-Angle end | Intermediate | Telephoto end |
|---|---|---|---|
| f | 7.20000 | 10.00000 | 13.70000 |
| d3 | 20.94619 | 15.35932 | 11.47940 |
| d9 | 3.10407 | 6.82211 | 11.73524 |

[Values for the conditions]
(1) ν1N − ν1P = 30.1
(2) (R3 + R1)/(R3 − R1) = −1.39
(3) |f1/w| = 2.60
(4) f3/f2 = 1.15

FIGS. 10A–10E show various aberrations of the third embodiment according to the present invention in the wide-angle end state. FIGS. 11A–11E show various aberrations of the embodiment in the intermediate focal length state. FIGS. 12A–12E show various aberrations of the embodiment in the telephoto end state. As is apparent from the respective diagrams showing the various aberrations, excellent correction is made for the various aberrations and good imaging quality is obtained.

The Fourth Embodiment

Figure 13:
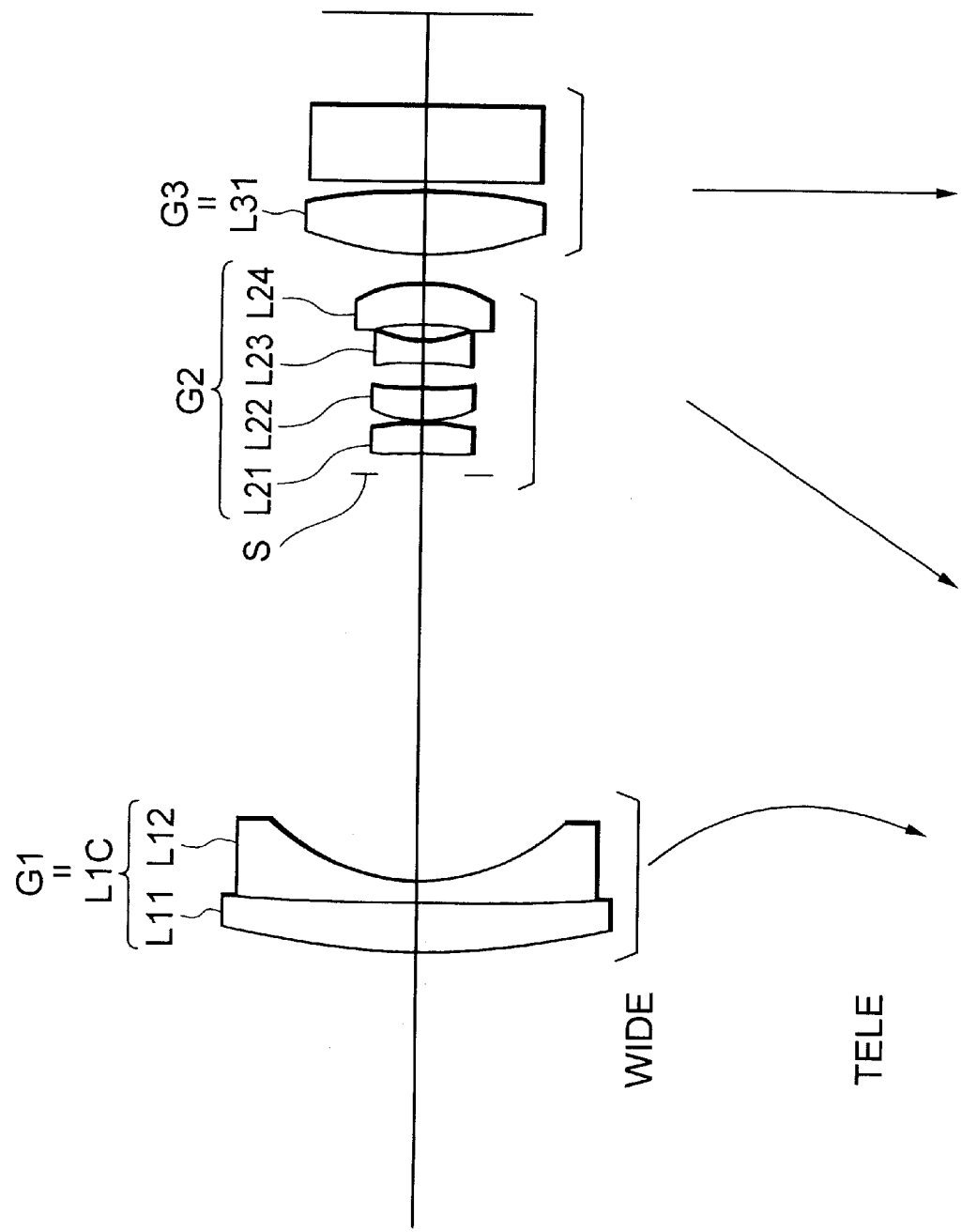
FIG. 13 is a view schematically showing the lens configuration of the fourth embodiment of the variable focal length lens system according to the present invention.

FIG. 13 is a view schematically showing the lens configuration of the fourth embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the first and second lens groups are moved such that a space between the first and second lens groups is decreased and a space between the second and third lens groups is increased when a state of the lens group positions is changed from a wide-angle end state to a telephoto end state, and the third lens group is fixed.

The first lens group G1 consists of a cemented negative lens component L1C consisting of, in order from the object side, a positive lens element L11 having double convex surfaces, and a negative meniscus lens element L12 having a convex surface facing to the object side.

The second lens group G2 consists of, in order from the object side, a positive lens element L21 having double convex surfaces, a positive meniscus lens element L22 having a convex surface facing to the object side, a negative lens element L23 having double concave surfaces, and a positive meniscus lens element L24 having a concave surface facing to the object side.

The third lens group G3 consists of a positive lens element L31 having double convex surfaces. The first lens group G1 is moved to the object direction when the focusing operation is performed from a far object to a near object.

Various values associated with the fourth embodiment are listed in Table 4.

TABLE 4

[Values on the whole]

| | Wide-Angle end | Intermediate | Telephoto end |
|---|---|---|---|
| f | 7.200 | 10.000 | 13.700 |
| Bf = 4.065 | | | |
| FNO | 3.75 | 4.37 | 5.19 |
| 2ω | 60.86° | 44.47° | 33.00° |

[Lens Datal

| | r | d | ν | n |
|---|---|---|---|---|
| 1 | 35.9002 | 2.2000 | 23.8 | 1.84666 |
| 2 | 205.6622 | 1.0000 | 53.9 | 1.71300 |
| 3 | 9.3717 | (d3) | | |
| 4 | ∞ | 0.8000 | | aperture diaphragm |
| 5 | 26.6714 | 1.4000 | 47.1 | 1.62374 |
| 6 | −11.3111 | 0.1000 | | |
| 7 | 5.2072 | 1.4000 | 50.8 | 1.65844 |
| 8 | 12.9440 | 1.2000 | | |
| 9 | −24.3910 | 1.0000 | 23.8 | 1.84666 |
| 10 | 5.4385 | 0.8000 | | |
| 11 | −8.5640 | 1.8000 | 45.0 | 1.74400 |
| 12 | −6.2853 | (d12) | | |
| 13 | 15.0853 | 2.8000 | 61.1 | 1.58913 |
| 14 | −27.7208 | 0.5000 | | |
| 15 | ∞ | 3.3400 | 64.1 | 1.51680 |
| 16 | ∞ | | | |

[Variable Distance Data]

| | Wide-Angle end | Intermediate | Telephoto end |
|---|---|---|---|
| f | 7.20011 | 10.00012 | 13.70005 |
| d3 | 18.26391 | 12.23308 | 8.04485 |
| d12 | 1.27726 | 5.09356 | 10.13655 |

[Values for the conditions]
(1) ν1N − ν1P = 30.1
(2) (R3 + R1)/(R3 − R1) = −1.71
(3) |f1/fw| = 2.78
(4) f3/f2 = 1.17

FIGS. 14A–14E show various aberrations of the fourth embodiment according to the present invention in the wide-angle end state. FIGS. 15A–15E show various aberrations of the embodiment in the intermediate focal length state. FIGS. 16A–16E show various aberrations of the embodiment in the telephoto end state. As is apparent from the respective diagrams showing the various aberrations, excellent correction is made for the various aberrations and good imaging quality is obtained.

The Fifth Embodiment

FIG. 17 is a view schematically showing the lens configuration of the fifth embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the first and third lens groups are fixed and the second lens group is moved to the object side such that a space between the first and second lens groups is decreased and a space between the second and third lens groups is increased when a state of the lens group positions is changed from a wide-angle end state to a telephoto end state, and an imaging device I is moved along the optical axis in order to correct variation of focal point associated with zooming operation.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, a negative lens element L22 having double concave surfaces, and a positive plano-convex lens element L23 having a planar surface facing to the object side.

The third lens group G3 consists of a positive lens element L31 having double convex surfaces. The imaging device I is moved opposite to the object direction when the focusing operation is performed from a far object to a near object. The focusing operation is not limited to this way, and it is possible to perform focusing by moving the first lens group G1 to the object side.

Various values associated with the fifth embodiment are listed in Table 5.

TABLE 5

[Values on the whole]

| | Wide-Angle end | Intermediate | Telephoto end |
|---|---|---|---|
| f | 7.200 | 10.747 | 14.311 |
| Bf | 3.969 | 3.293 | 3.566 |
| FNO | 3.51 | 4.33 | 4.92 |
| 2ω | 60.93° | 41.68° | 31.72° |

[Lens Data]

| | r | d | ν | n |
|---|---|---|---|---|
| 1 | 37.7058 | 2.2000 | 25.4 | 1.80518 |
| 2 | −118.7295 | 1.0000 | 53.9 | 1.71300 |
| 3 | 9.5064 | (d3) | | |
| 4 | ∞ | 0.8000 | | aperture diaphragm |
| 5 | 6.3386 | 2.5000 | 52.3 | 1.74810 |
| 6 | −26.3063 | 2.2000 | | |
| 7 | −5.1115 | 0.9000 | 25.4 | 1.80518 |
| 8 | 9.3344 | 0.6000 | | |
| 9 | ∞ | 2.5000 | 40.9 | 1.79631 |
| 10 | −7.0714 | (d10) | | |
| 11 | 13.9396 | 2.8000 | 61.1 | 1.58913 |
| 12 | −32.8863 | 0.5000 | | |
| 13 | ∞ | 3.3400 | 64.1 | 1.51680 |
| 14 | ∞ | | | |

[Variable Distance Data]

| | Wide-Angle end | Intermediate | Telephoto end |
|---|---|---|---|
| f | 7.20022 | 10.74668 | 14.31051 |
| d3 | 15.76000 | 9.72917 | 5.54094 |
| d10 | 1.00000 | 7.03083 | 11.21906 |

[Values for the conditions]
(1) ν1N − ν1P = 28.5
(2) (R3 + R1)/(R3 − R1) = −1.67
(3) |f1/fw| 2.78
(4) f3/f2 = 1.17

FIGS. 18A–18E show various aberrations of the fifth embodiment according to the present invention in the wide-angle end state. FIGS. 19A–19E show various aberrations of the embodiment in the intermediate focal length state. FIGS. 20A–20E show various aberrations of the embodiment in the telephoto end state. As is apparent from the respective diagrams showing the various aberrations, excellent correction is made for the various aberrations and good imaging quality is obtained.

The Sixth Embodiment

Figure 21:
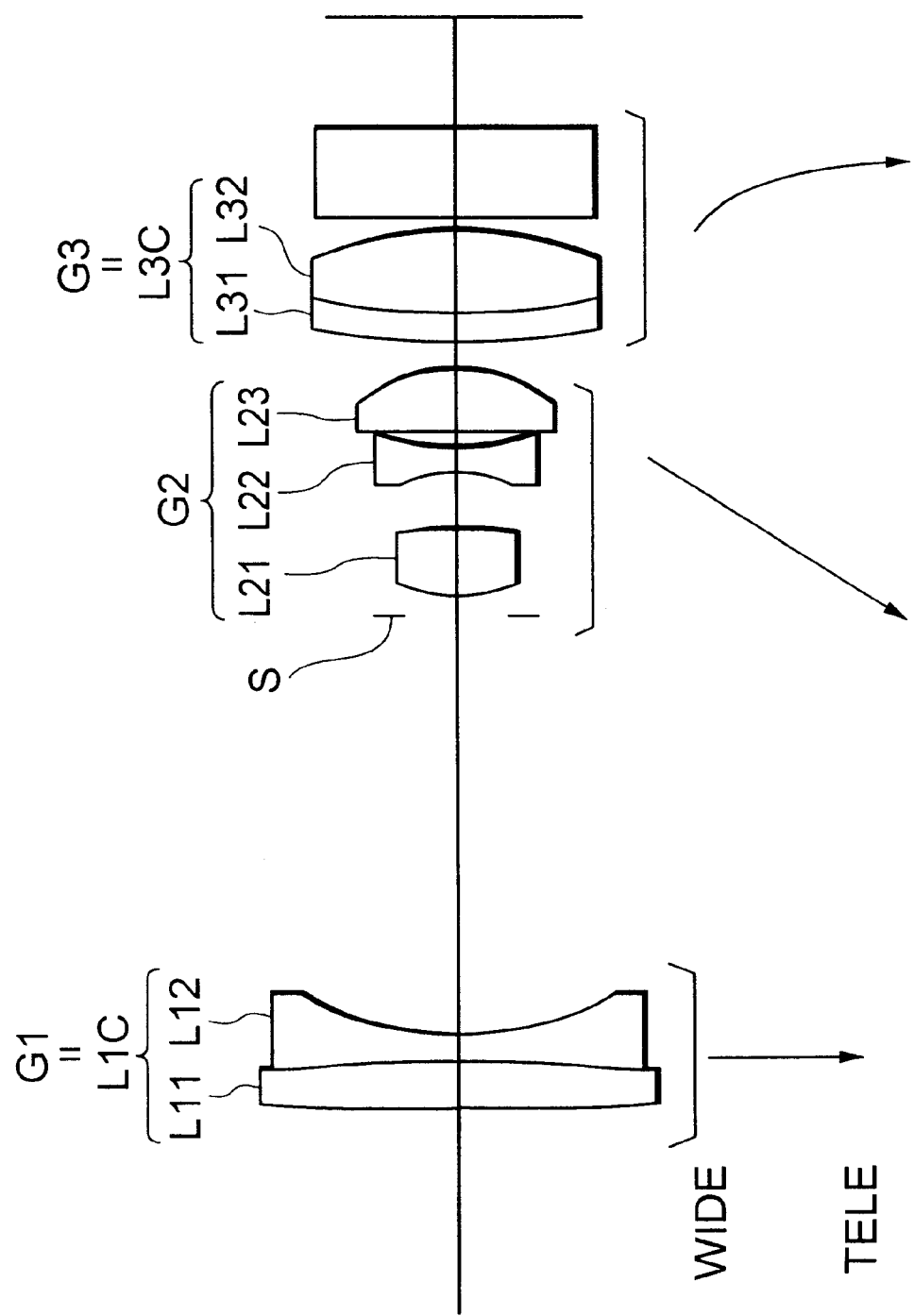
FIG. 21 is a view schematically showing the lens configuration of the sixth embodiment of the variable focal length lens system according to the present invention.

FIG. 21 is a view schematically showing the lens configuration of the sixth embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the second lens group is moved to the object side and the third lens group is moved such that a space between the first and second lens groups is decreased and a space between the second and third lens groups is increased when a state of the lens group positions is changed from a wide-angle end state to a telephoto end state, and the first lens group is fixed.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, a negative lens element L22 having double concave surfaces, and a positive meniscus lens element L23 having a concave surface facing to the object side, wherein an image side surface of the positive meniscus lens element L23 is made a spherical surface.

The third lens group G3 consists of a cemented positive lens component L3C consisting of, in order from the object side, a negative meniscus lens element L31 having a convex surface facing to the object side and a positive lens element L32 having double convex surfaces. The first lens group G1 is moved to the object side when the focusing operation is performed from a far object to a near object.

Various values associated with the sixth embodiment are listed in Table 6. An a spherical surface is expressed by the following equation;

$$X(y)=y^2/[r \cdot \{1+(1-K \cdot y^2/r^2)^{1/2}\}]+C4 \cdot y^4+C6 \cdot y^6+C8 \cdot y^8+C10 \cdot y^{10}$$

where $X(y)$ denotes displacement along the optical axis from the tangent plane on the vertex of the aspherical surface to the aspherical surface at the height y, r denotes a paraxial radius of curvature, K denotes the conical coefficient, and Ci denotes the i-th order aspherical surface coefficient.

TABLE 6

[Values on the whole]

| | Wide-Angle end | Intermediate | Telephoto end |
|---|---|---|---|
| f | 7.200 | 10.000 | 13.700 |
| Bf | 4.232 | 3.128 | 2.931 |
| FNO | 3.48 | 4.22 | 4.91 |
| 2ω | 61.01° | 44.95° | 33.49° |

[Lens Data]

| | r | d | ν | n |
|---|---|---|---|---|
| 1 | 263.6322 | 1.8000 | 25.4 | 1.80518 |
| 2 | −68.6182 | 1.0000 | 53.9 | 1.71300 |
| 3 | 12.4331 | (d3) | | |
| 4 | ∞ | 0.8000 | | aperture diaphragm |
| 5 | 6.0247 | 2.5000 | 45.0 | 1.74400 |
| 6 | −27.5998 | 2.2000 | | |
| 7 | −4.4880 | 0.9000 | 25.4 | 1.80518 |
| 8 | 9.0355 | 0.6000 | | |
| 9 | −47.4915 | 2.4000 | 45.4 | 1.79668 |
| 10 | −5.8028 | (d10) | | |
| 11 | 35.2440 | 1.0000 | 25.4 | 1.80518 |
| 12 | 24.6025 | 3.2000 | 61.1 | 1.58913 |
| 13 | −13.4476 | 0.5000 | | |
| 14 | ∞ | 3.3400 | 64.1 | 1.51680 |
| 15 | ∞ | | | |

TABLE 6-continued

[Aspherical Surface Data]

Surface Number 10

K = 0.9680
C4 = 0.0
C6 = 0.0
C8 = −7.0794 × 10⁻⁷
C10 = 0.0

[Variable Distance Data]

|  | Wide-Angle end | Intermediate | Telephoto end |
|---|---|---|---|
| f | 7.19994 | 10.00000 | 13.70000 |
| d3 | 15.91734 | 11.49608 | 6.99084 |
| d10 | 1.03860 | 6.56356 | 11.26581 |

[Values for the conditions]

(1) ν1N − ν1P = 28.5
(2) (R3 + R1) / (R3 − R1) = −1.10
(3) |f1 / fw| = 2.64
(4) f3 / f2 = 1.22

FIGS. 22A–22E show various aberrations of the sixth embodiment according to the present invention in the wide-angle end state. FIGS. 23A–23E show various aberrations of the embodiment in the intermediate focal length state. FIGS. 24A–24E show various aberrations of the embodiment in the telephoto end state. As is apparent from the respective diagrams showing the various aberrations, excellent correction is made for the various aberrations and good imaging quality is obtained.

The Seventh Embodiment

Figure 25:
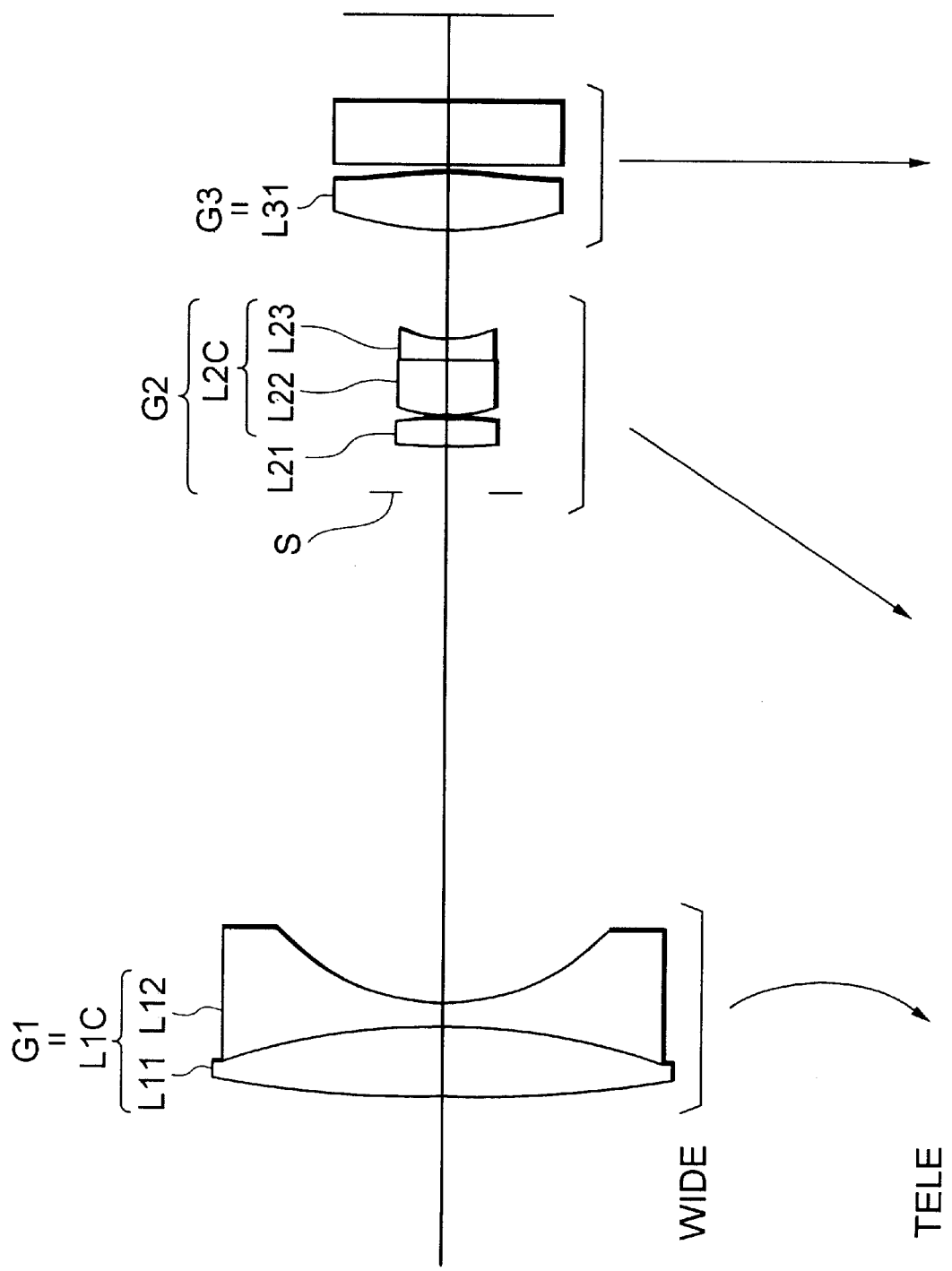
FIG. 25 is a view schematically showing the lens configuration of the seventh embodiment of the variable focal length lens system according to the present invention.

FIG. 25 is a view schematically showing the lens configuration of the seventh embodiment of the variable focal length lens system according to the present invention. It has, in order from an object side, a first lens group G1 having a negative refractive power, an aperture diaphragm S, a second lens group G2 having a positive refractive power, and a third lens group G3 having a positive refractive power, wherein the first G1 and second G2 lens groups are moved to the object side such that a space between the first G1 and second G2 lens groups decreased and a space between the second G2 and third G3 lens groups is increased when a state of the lens group positions is changed from a wide-angle end state to a telephoto end state, and the third lens group G3 is fixed.

The first lens group G1 consists of a cemented negative lens component L1C consisting of, in order from the object side, a positive lens element L11 having double convex surfaces, and a negative lens element L12 having double concave surfaces.

The second lens group G2 consists of, in order from the object side, a positive lens element L21 having double convex surfaces, a cemented negative lens component L2C consisting of, in order from the object side, a positive meniscus lens element L22 having a convex surface facing to the object side and a negative meniscus lens element L23 having a convex surface facing to the object side.

The third lens group G3 consists of a positive lens element L31 having double convex surfaces. The object side surface of the positive lens element L31 is made aspherical surface.

It is preferable that the first lens group G1 is moved to the object side, or the third lens group G3 is moved to the object side when the focusing operation is performed from a far object to a near object.

Various values associated with the seventh embodiment are listed in Table 7. An aspherical surface is expressed by the following equation;

$$X(y)=y^2/[r\cdot\{1+(1-K\cdot y^2/r^2)^{1/2}\}]+C4\cdot y^4+C6\cdot y^6+C8\cdot y^8+C10\cdot y^{10}$$

where X(y) denotes displacement along the optical axis from the tangent plane on the vertex of the aspherical surface to the aspherical surface at the height y, r denotes a paraxial radius of curvature, K denotes the conical coefficient, and Ci denotes the i-th order aspherical surface coefficient.

TABLE 7

[Values on the whole]

|  | Wide-Angle end | Intermediate | Telephoto end |
|---|---|---|---|
| f | 5.300 | 8.900 | 15.000 |
| Bf = 2.102 | | | |
| FNO | 3.49 | 4.46 | 6.15 |
| 2 ω | 62.6° | 37.5° | 22° |

[Lens Data]

| | r | d | ν | n |
|---|---|---|---|---|
| 1) | 45.9976 | 2.5 | 25.43 | 1.80518 |
| 2) | −25.3399 | 0.8 | 48.31 | 1.66672 |
| 3) | 7.6532 | (d3) | | |
| 4) | ∞ | 1.6 | | aperture diaphragm |
| 5) | 17.6342 | 1 | 46.58 | 1.804 |
| 6) | −24.2545 | 0.1 | | |
| 7) | 5.8985 | 2 | 46.58 | 1.804 |
| 8) | 58.1685 | 0.75 | 25.43 | 1.80518 |
| 9) | 4.2769 | (d9) | | |
| 10) | 10.6164 | 2 | 59.44 | 1.58313 |
| 11) | −32.4581 | 0.3 | | |
| 12) | ∞ | 2.17 | 64.2 | 1.5168 |
| 13) | ∞ | | | |

[Aspherical Surface Data]

Surface Number 10

K = 1.0000
C4 = −5.09778 × 10⁻⁴
C6 = 4.10054 × 10⁻⁵
C8 = −2.66028 × 10⁻⁶
C10 = 5.65286 × 10⁻⁸

[Variable Distance Data]

|  | Wide-Angle end | Intermediate | Telephoto end |
|---|---|---|---|
| f | 5.300 | 8.900 | 15.000 |
| d3 | 18.04385 | 9.59417 | 4.52069 |
| d9 | 3.80248 | 7.99328 | 15.10342 |

[Values for the conditions]

(1) ν1N − ν1P = 22.9
(2) (R3 + R1) / (R3 − R1) = −1.39
(3) |f1 / fw| = 3.08
(4) f3 / f2 = 1.23

FIGS. 26A–26E show various aberrations of the seventh embodiment according to the present invention in the wide-angle end state. FIGS. 27A–27E show various aberrations of the embodiment in the intermediate focal length state. FIGS. 28A–28E show various aberrations of the embodiment in the telephoto end state. As is apparent from the respective diagrams showing the various aberrations, excellent correction is made for the various aberrations and good imaging quality is obtained.

As described above, the present invention makes it possible to provide a variable focal length lens system with low cost, suitable for use with a video camera or a digital still camera employing a solid-state imaging device, capable of assembling and adjusting with ease, and to provide an imaging apparatus equipped with the lens system.

What is claimed is:

1. A variable focal length lens system comprising, in order from an object side:
    a first lens group having a negative refractive power;
    a second lens group having a positive refractive power; and
    a third lens group having a positive refractive power; wherein
    said first lens group consists of a cemented negative lens component,
    said second lens group comprises two positive lens elements and at least one negative lens element, and
    said third lens group consists of a single lens component; and wherein
    a space between said first and second lens groups is decreased and
    a space between said second and third lens groups is increased
    when a state of the lens group positions is changed from a wide-angle end state to telephoto end state, and wherein
    said cemented negative lens component in said first lens group is a cemented lens consisting of, in order from the object side, a positive lens element and a negative lens element having double concave surfaces.

2. variable focal length lens system according to claim 1, and further satisfying following conditional equation:

v1N−v1P>20 where v1N denotes Abbe number of said negative lens element in said first lens group and v1P denotes Abbe number of said positive lens element in said first lens group.

3. A variable focal length lens system according to claim 1, and further satisfying following conditional equation:

−2.5<(R3+R1)/(R3−R1)<−0.5 where R1 denotes a radius of curvature on the object side surface of said cemented negative lens component, and R3 denotes a radius of curvature on an image side surface of said cemented negative lens component.

4. A variable focal length lens system according to claim 1, wherein:
    said third lens group consists of only a single positive lens element having double convex surfaces.

5. A variable focal length lens system according to claim 1, wherein:
    said third lens group consists of a single cemented positive lens component consisting of:
        a positive lens element having double convex surfaces and
        a negative lens element having meniscus shape.

6. A variable focal length lens system according to claim 1, wherein:
    said second lens group consists of, in order from the object side, two positive lens elements and one negative lens element.

7. A variable focal length lens system according to claim 1, wherein:
    said second lens group consists of, in order from the object side:
        a positive lens element; and
        a cemented negative lens component;
        wherein said cemented negative lens component consists of, in order from the object side,
            a positive lens element having double convex surfaces and
            a negative lens element having double concave surfaces.

8. A variable focal length lens system according to claim 1, wherein:
    said second lens group consists of, in order from the object side:
        a positive lens element having double convex surfaces,
        a negative lens element having double concave surfaces, and
        a positive lens element having a concave surface facing to the object side.

9. A variable focal length lens system according to claim 1, wherein:
    said second lens group consist of, in order from the object side;
    two positive lens elements,
    a negative lens element, and
    a meniscus lens element having a concave surface facing to the object side.

10. A variable focal length lens system according to claim 1, wherein:
    said second lens group consists of, in order from the object side:
        a positive lens element,
        a cemented negative lens component, and
        a meniscus lens element having a concave surface facing to the object side,
        wherein said cemented negative lens component consists of, in order from the object side,
            a positive lens element having double convex surfaces and
            a negative lens element having double concave surfaces.

11. A variable focal length lens system according to claim 1, wherein:
    said first lens group moves,
    said second lens group moves to the object side, and
    said third lens group is fixed,
    when a state of the lens group position is changed from the wide-angle end state to the telephoto end state.

12. A variable focal length lens system according to claim 1, wherein:
    said first lens group is fixed,
    said second lens group moves to the object side, and
    said third lens group moves;
    when a state of the lens group position is changed from the wide-angle end state to the telephoto end state.

13. A variable focal length lens system according to claim 1, wherein:
    said first lens group is moved to the object side when the focusing operation is performed from a far object to a near object.

14. An imaging apparatus comprising:
    a variable focal length lens system; and
    an imaging device taking images formed by said variable focal length lens system, wherein said variable focal length lens system comprises, in order from an object side, a first lens group having a negative refractive power;

a second lens group having a positive refractive power; and a third lens group having a positive refractive power; wherein said first lens group consists of a cemented negative lens component, said second lens group comprises two positive lens elements and at least one negative lens element, and said third lens group consists of a single lens component; and wherein said first and third lens groups are fixed, said second lens group is moved to the object side, and said imaging device is moved when a state of the lens group position is changed from a wide-angle end state to a telephoto end state.

* * * * *

UNITED STATES PATENT AND TRADEMARK OFFICE
CERTIFICATE OF CORRECTION

PATENT NO.   : 6,349,002 B1
DATED        : February 19, 2002
INVENTOR(S)  : Atsushi Shibayama et al.

It is certified that error appears in the above-identified patent and that said Letters Patent is hereby corrected as shown below:

<u>Title page,</u>
Item [30], Foreign Application Priority Data should read:

Apr. 27, 1999 (JP) ........................ 11-120047
Feb. 29, 2000 (JP) ........................ 2000-053980

Signed and Sealed this

Twenty-first Day of May, 2002

*Attest:*

*Attesting Officer*

JAMES E. ROGAN
*Director of the United States Patent and Trademark Office*